(12) United States Patent
Kaneko et al.

(10) Patent No.: US 12,462,535 B2
(45) Date of Patent: Nov. 4, 2025

(54) LEARNING DATA GENERATION DEVICE, LEARNING DATA GENERATION METHOD AND RECORDING MEDIUM

(71) Applicant: NEC Corporation, Tokyo (JP)

(72) Inventors: Tomokazu Kaneko, Tokyo (JP); Soma Shiraishi, Tokyo (JP); Ryosuke Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 18/202,060

(22) Filed: May 25, 2023

(65) Prior Publication Data

US 2023/0386180 A1    Nov. 30, 2023

(30) Foreign Application Priority Data

May 31, 2022   (JP) .................................. 2022-088198

(51) Int. Cl.
*G06V 10/774*  (2022.01)
*G06T 3/40*   (2006.01)
*G06V 10/74*  (2022.01)

(52) U.S. Cl.
CPC .............. *G06V 10/774* (2022.01); *G06T 3/40* (2013.01); *G06V 10/761* (2022.01)

(58) Field of Classification Search
CPC .. G06V 10/774; G06V 10/761; G06V 10/764; G06T 3/40
See application file for complete search history.

(56) References Cited

U.S. PATENT DOCUMENTS

| | | | |
|---|---|---|---|
| 10,482,512 B2* | 11/2019 | Meek | G06Q 30/0601 |
| 10,885,336 B1* | 1/2021 | Davis | G06N 7/01 |
| 2015/0170256 A1* | 6/2015 | Pettyjohn | G06Q 30/0603 |
| | | | 705/26.9 |
| 2018/0002109 A1* | 1/2018 | Yamashita | G06V 10/17 |
| 2018/0181913 A1* | 6/2018 | Higa | G06Q 30/0241 |
| 2020/0005492 A1* | 1/2020 | Higa | G06N 20/00 |
| 2020/0013169 A1* | 1/2020 | Higa | G06F 18/2433 |
| 2020/0402139 A1* | 12/2020 | Higa | G06Q 20/203 |
| 2020/0410275 A1* | 12/2020 | Higa | G06V 40/20 |
| 2021/0004756 A1* | 1/2021 | Kulkarni Wadhonkar | |
| | | | G06V 20/52 |

(Continued)

FOREIGN PATENT DOCUMENTS

JP     2020-119283 A     8/2020

*Primary Examiner* — Aaron W Carter
(74) *Attorney, Agent, or Firm* — Sughrue Mion, PLLC

(57) ABSTRACT

In a learning data generation device, an acquisition means acquires a first image corresponding to an image obtained by photographing one or more objects arranged in a predetermined arrangement state, and first information corresponding to information indicating the predetermined arrangement state in the first image. An image deformation means deforms a second image corresponding to an image of a desired object. An image generation means generates a fourth image having an arrangement state that matches or is similar to the predetermined arrangement state indicated by the first image, by pasting a deformed second image to the first image or a third image corresponding to the image of a position where the desired object is arranged. A learning data generation means generates data including the fourth image and second information corresponding to the information indicating the arrangement state of the object in the fourth image, as learning data.

10 Claims, 28 Drawing Sheets

(56) References Cited

U.S. PATENT DOCUMENTS

| | | | |
|---|---|---|---|
| 2022/0055226 A1* | 2/2022 | Kitagawa | B25J 9/1697 |
| 2023/0063863 A1* | 3/2023 | Furukawa | G06Q 30/06 |
| 2023/0386180 A1* | 11/2023 | Kaneko | G06V 10/764 |
| 2024/0119408 A1* | 4/2024 | Chen | G06V 20/36 |
| 2025/0005947 A1* | 1/2025 | Delgado del Hoyo | G06V 30/19173 |
| 2025/0182315 A1* | 6/2025 | Kaneko | G06V 10/82 |

* cited by examiner

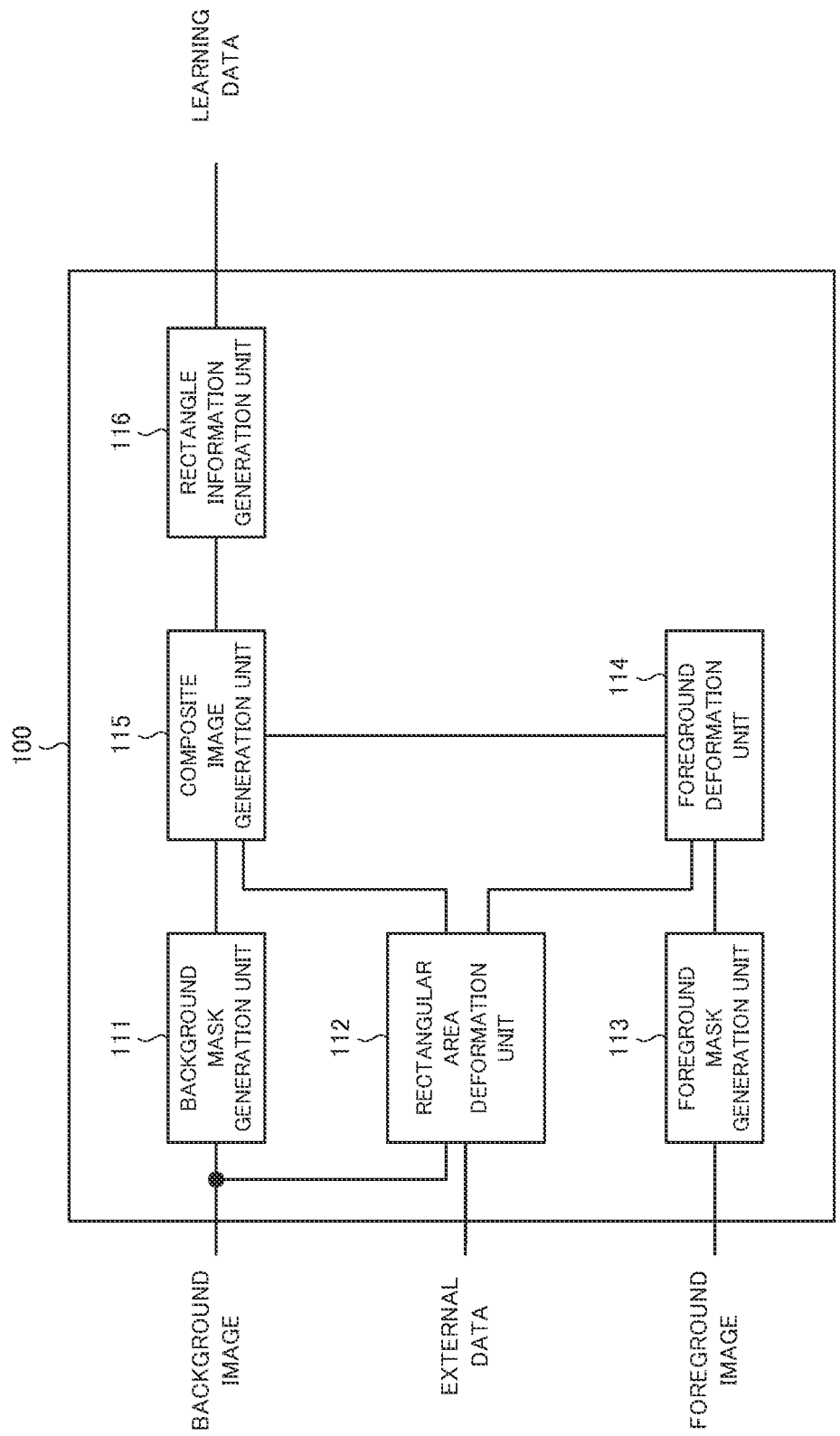

LEARNING DATA GENERATION DEVICE, LEARNING DATA GENERATION METHOD AND RECORDING MEDIUM

TECHNICAL FIELD

The present disclosure relates to a technique available for generating learning data.

BACKGROUND ART

There is known a method of analyzing shelf allocation of products by a learned model learned using learning data including images photographing the product shelf in a store. In addition, there has been conventionally proposed a method of using new images generated on the basis of the images of actual product shelves as the above-described learning data.

Specifically, for example, Patent Document 1 discloses a technique for generating a composite image by synthesizing images of products (coffee) with a background image of a shelf on which products (beverages) are displayed, and generating a plurality of composite images by adjusting attribute information (contrast, size, rotation angle and noise) corresponding to the composite images. In addition, Patent Document 1 discloses a technique of generating a learned model by learning teacher data including a plurality of composite images generated as described above and a product name and a price included in the product information corresponding to each of the plurality of composite images.

Patent Document 1: Japanese Patent Application Laid-Open under No. 2020-119238

SUMMARY

However, according to the technique disclosed in Patent Document 1, for example, a composite image in which the display condition of the products on the product shelf is significantly different from the display state of the products actually on the product shelf can be generated with a high probability, and the teacher data including such composite images are used for the learning. Therefore, there is such a problem that it is difficult to efficiently construct a learning model to be used for shelf allocation of products.

One object of the present disclosure is to provide a learning data generation device capable of efficiently constructing a learning model used for analysis of shelf allocation of products.

According to an example aspect of the present invention, there is provided a learning data generation device comprising:

an acquisition means configured to acquire a first image corresponding to an image obtained by photographing one or more objects arranged in a predetermined arrangement state, and first information corresponding to information indicating the predetermined arrangement state in the first image;

an image deformation means configured to deform a second image corresponding to an image of a desired object;

an image generation means configured to generate a fourth image having an arrangement state that matches or is similar to the predetermined arrangement state indicated by the first image, by pasting a deformed second image to the first image or a third image corresponding to the image of a position where the desired object is arranged; and a learning data generation means configured to generate data including the fourth image and second information corresponding to the information indicating the arrangement state of the object in the fourth image, as learning data.

According to another example aspect of the present invention, there is provided a learning data generation method comprising:

acquiring a first image corresponding to an image obtained by photographing one or more objects arranged in a predetermined arrangement state, and first information corresponding to information indicating the predetermined arrangement state in the first image;

deforming a second image corresponding to an image of a desired object;

generating a fourth image having an arrangement state that matches or is similar to the predetermined arrangement state indicated by the first image, by pasting a deformed second image to the first image or a third image corresponding to the image of a position where the desired object is arranged; and generating data including the fourth image and second information corresponding to the information indicating the arrangement state of the object in the fourth image, as learning data.

According to still another example aspect of the present invention, there is provided a recording medium recording a program, the program causing a computer to a processing comprising:

acquiring a first image corresponding to an image obtained by photographing one or more objects arranged in a predetermined arrangement state, and first information corresponding to information indicating the predetermined arrangement state in the first image;

deforming a second image corresponding to an image of a desired object;

generating a fourth image having an arrangement state that matches or is similar to the predetermined arrangement state indicated by the first image, by pasting a deformed second image to the first image or a third image corresponding to the image of a position where the desired object is arranged; and generating data including the fourth image and second information corresponding to the information indicating the arrangement state of the object in the fourth image, as learning data.

According to the present disclosure, it is possible to efficiently construct a learning model that is used for analyzing shelf allocation of products.

BRIEF DESCRIPTION OF THE DRAWINGS

FIG. 3 is a block diagram illustrating a functional configuration of the learning data generation device according to the first example embodiment.

EXAMPLE EMBODIMENTS

Preferred example embodiments of the present disclosure will be described with reference to the accompanying drawings.

First Example Embodiment

[System Configuration]

Figure 1:
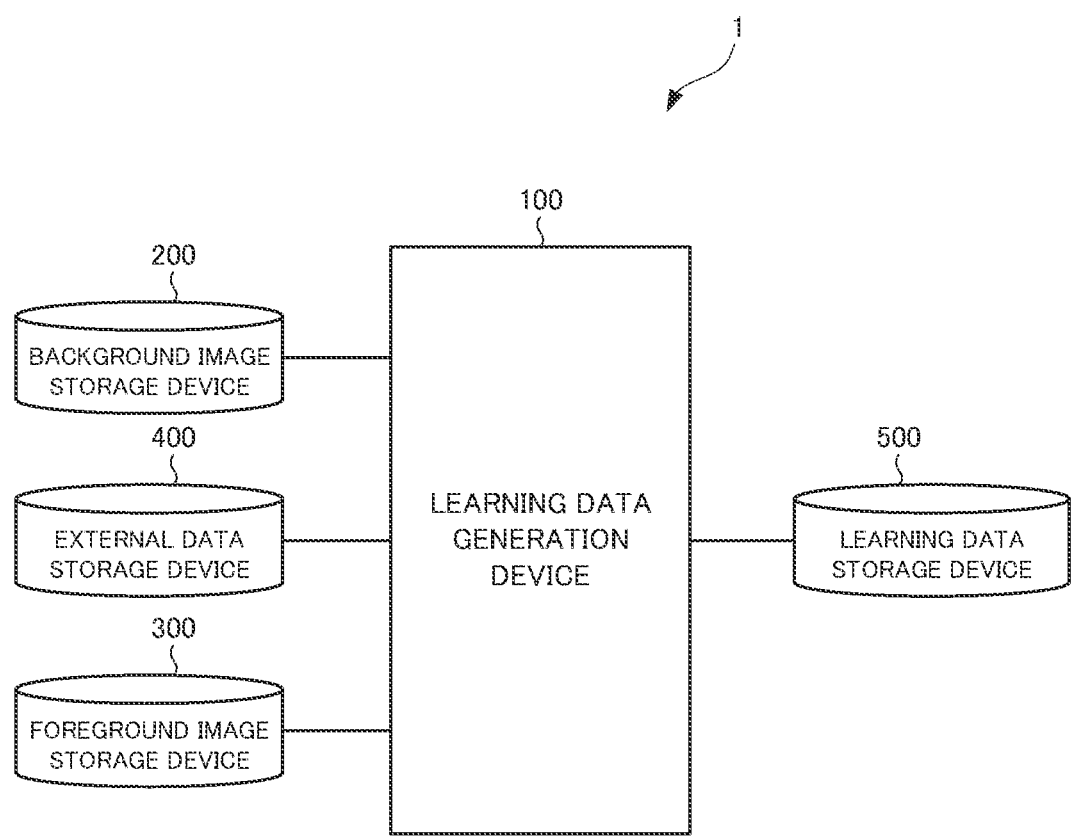
FIG. 1 is a diagram illustrating an example of a configuration of a data processing system including a learning data generation device according to a first example embodiment.

FIG. 1 is a diagram illustrating an example of a configuration of a data processing system including a learning data generation device according to a first example embodiment. As shown in FIG. 1, the data processing system 1 includes a learning data generation device 100, a background image storage device 200, a foreground image storage device 300, an external data storage device 400, and a learning data storage device 500.

The learning data generation device 100 generates learning data based on the background images acquired from the background image storage device 200, the foreground images acquired from the foreground image storage device 300, and the external data acquired from the external data storage device 400, and outputs the generated learning data to the learning data storage device 500.

The background image storage device 200 is configured, for example, as a database in which one or more background images are stored. The background image may be an image representing a condition in which no product is disposed in a single place, such as an empty product shelf, for example. In other words, the background image may be an image of a place where desired products are arranged.

The foreground image storage device 300 is configured, for example, as a database in which one or more foreground images are stored. The foreground image may be an image of a desired product that is disposed at a location such as a product shelf, for example.

The external data storage device 400 is configured, for example, as a database in which one or more external data are stored. The external data includes a shelf allocation image corresponding to an image obtained by photographing a display state (arrangement state) of one or a plurality of products actually disposed on the product shelf, and rectangle information corresponding to information indicating the arrangement positions of the products in the shelf allocation image. In other words, the external data includes the shelf allocation image corresponding to an image obtained by photographing objects disposed in a predetermined arrangement state, and the rectangle information corresponding to information indicating the predetermined arrangement state in the shelf allocation image. Further, the rectangle information of the external data includes information indicating the position (coordinates) of one or a plurality of rectangular areas having a shape to surround the periphery of the product in the shelf allocation image.

The learning data storage device 500 is configured as a database for storing the learning data outputted from the learning data generation device 100. The learning data corresponds to the data for the learning to construct a learned model available for analyzing allocation of products to shelves. Specifically, the learning data includes, for example, a composite image obtained by pasting foreground images on a background image and rectangle information corresponding to information indicating the arrangement position of one or more products in the composite image. Also, the rectangle information of the learning data includes information indicating the position (coordinates) of one or a plurality of rectangular areas having a shape to surround the periphery of the product in the composite image. Details of the method of generating the composite image will be described later.

[Hardware Configuration]

Figure 2:
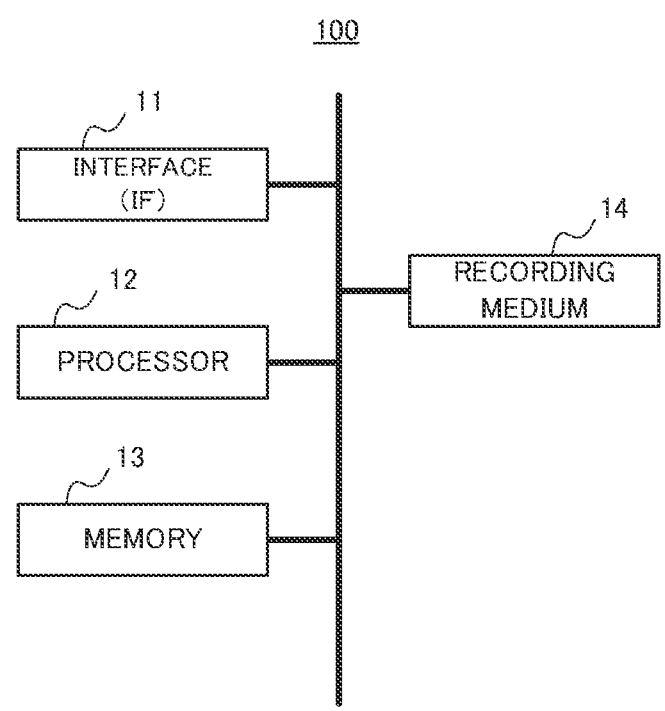
FIG. 2 is a block diagram illustrating a hardware configuration of the learning data generation device according to the first example embodiment.

FIG. 2 is a block diagram illustrating a hardware configuration of the learning data generation device according to the first example embodiment. The learning data generation device 100 includes an interface (IF) 11, a processor 12, a memory 13, and a recording medium 14 as illustrated in FIG. 2.

The IF 11 inputs and outputs data to and from external devices. Specifically, for example, the background image, the foreground image, and the external data are inputted through the IF 11. In addition, the learning data or the like is outputted to the external device through the IF 11.

The processor 12 is a computer such as a CPU (Central Processing Unit) and a GPU (Graphics Processing Unit) and controls the entire learning data generation device 100 by executing a program prepared in advance.

The memory 13 may be a ROM (Read Only Memory) and a RAM (Random Access Memory). The memory 13 is also used as a working memory during various operations by the processor 12.

The recording medium 14 is a non-volatile and non-transitory recording medium such as a disk-like recording medium or a semiconductor memory and is configured to be detachable from the learning data generation device 100. The recording medium 14 records various programs executed by the processor 12. When the learning data generation device 100 executes various processing, the program recorded in the recording medium 14 is loaded into the memory 13 and executed by the processor 12.

[Function Configuration]

FIG. 3 is a block diagram illustrating a functional configuration of the learning data generation device according to the first example embodiment. As shown in FIG. 3, the learning data generation device 100 includes a background mask generation unit 111, a rectangular area deformation unit 112, a foreground mask generation unit 113, a foreground deformation unit 114, a composite image generation unit 115, and a rectangle information generation unit 116.

The background mask generation unit 111 acquires a background image from the background image storage device 200, generates a background mask based on the acquired background image, and outputs the background image and the background mask to the composite image generation unit 115. The background mask is generated, for example, as an image in which the entire background image is filled with a predetermined color such as black.

The rectangular area deformation unit 112 performs processing for deforming each rectangular area included in the rectangle information of the external data to conform to the size of the same background image as that acquired by the background mask generation unit 111 on the basis of the size of the shelf allocation image of the external data acquired from the external data storage device 400. Also, the rectangular area deformation unit 112 generates the rectangle deformation information including the information indicating the position (coordinates) of each of the deformed rectangular areas obtained through the above-described processing, and outputs the generated rectangle deformation information to the foreground deformation unit 114 and the composite image generation unit 115.

The foreground mask generation unit 113 generates a foreground mask based on the foreground image acquired from the foreground image storage device 300, and outputs the foreground image and the foreground mask to the foreground deformation unit 114. For example, the foreground mask is generated as an image in which the inside of the product included in the foreground image is colored with a predetermined color such as white, and the outside of the product included in the foreground image is colored with a color different from the predetermined color. The color used to color the inside of the product of the foreground image may be a color that is different from the color used to paint the entire background image.

The foreground deformation unit 114 performs processing for deforming the foreground image and the foreground mask acquired from the foreground mask generation unit 113 so as to be within the deformed rectangular area indicated by the rectangle deformation information acquired from the rectangular area deformation unit 112. Also, the foreground deformation unit 114 outputs the deformed foreground image and the deformed foreground mask obtained by the above-described processing to the composite image generation unit 115.

In the following description, unless otherwise indicated, the portions of the products in the foreground image shall be deformed by the foreground deformation unit 114, and the portions other than the products in the foreground image shall be discarded at the time of deformation. Further, in the following description, unless otherwise specified, the portions of the foreground mask colored with a predetermined color shall be deformed by the foreground deformation portion 114, and the portions of the foreground mask colored with a color different from the predetermined color shall be discarded at the time of deformation.

The composite image generation unit 115 executes a process for specifying the positions of the deformed rectangular areas in the background image acquired from the background mask generation unit 111 as the pasting positions of the deformed foreground images on the basis of the rectangle deformation information acquired from the rectangular area deformation unit 112. The composite image generation unit 115 generates the composite image by pasting the deformed foreground images acquired from the foreground deformation unit 114 onto the deformed rectangular areas for which the positions in the background image are specified by the above-described process. The composite image generation unit 115 generates the composite mask by pasting the deformed foreground masks obtained from the foreground deformation unit 114 onto the background mask obtained from the background mask generation unit 111. The pasting positions of the deformed foreground masks in the background mask are set to the same positions as the pasting positions of the deformed foreground images in the composite image. The composite image generation unit 115 outputs the composite image and the composite mask generated as described above to the rectangle information generation unit 116.

The rectangle information generation unit 116 generates the rectangle information corresponding to information indicating the arrangement position of one or a plurality of products in the composite image acquired together with the composite mask on the basis of the composite mask acquired from the composite image generation unit 115. The rectangle information generated by the rectangle information generation unit 116 includes information indicating the position (coordinates) of one or a plurality of rectangular areas having a shape to surround the periphery of the product in the composite image. In other words, the rectangle information generated by the rectangle information generation unit 116 includes information indicating the arrangement state of the products in the composite image. The rectangle information generation unit 116 generates data including the composite image acquired from the composite image generation unit 115 and the generated rectangle information as described above as the learning data, and outputs the generated learning data to the learning data storage device 500.
[Specific Example of Processing Executed by the Learning Data Generation Device]

Next, description will be given of the specific example of the processing executed by the learning data generation device according to the first example embodiment.

Figure 4A:
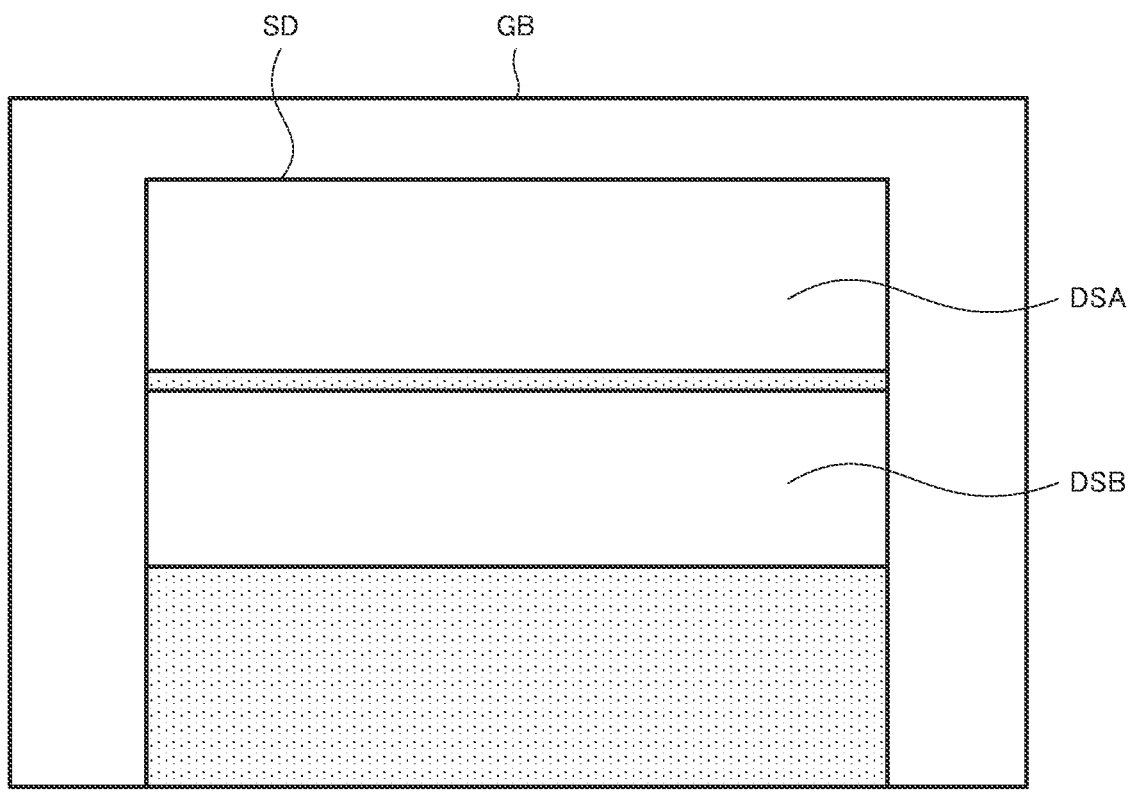
FIG. 4A is a diagram illustrating an example of a background image used in processing of the learning data generation device according to the first example embodiment.
Figure 4B:
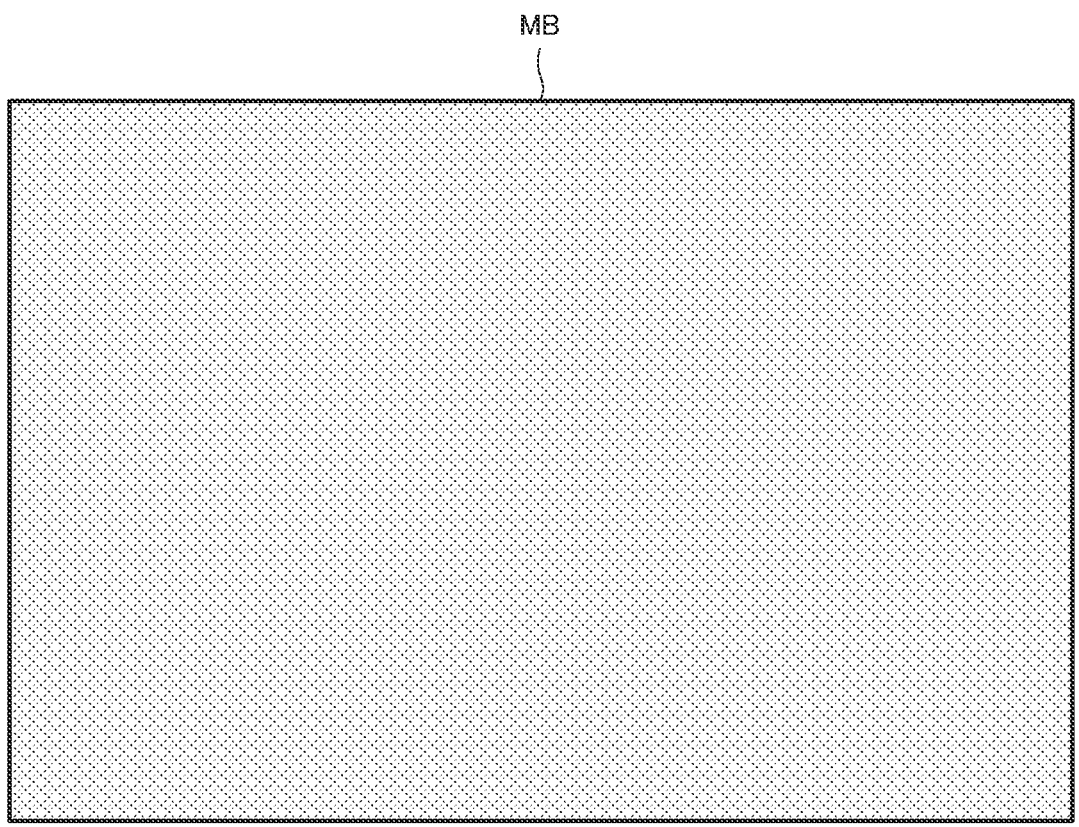
FIG. 4B is an example of a background mask generated by the processing of the learning data generation device according to the first example embodiment.

The background mask generation unit 111 acquires a background image GB as shown in FIG. 4A, for example, from the background image storage device 200, and generates a background mask MB as shown in FIG. 4B based on the background image GB. The background mask generation unit 111 outputs the background image GB and the background mask MB to the composite image generation unit 115. FIG. 4A is a diagram illustrating an example of the background image used in the process of the learning data generation device according to the first example embodiment. FIG. 4B is a diagram illustrating an example of the background masking generated by the process of the learning data generation device according to the first example embodiment.

The background image GB of FIG. 4A corresponds to an image obtained by photographing the entire empty product shelf SD having a horizontally long display spaces DSA and DSB aligned in the vertical direction. Further, the background mask MB of FIG. 4B corresponds to an image in which the entire background image GB is filled with a predetermined color. Incidentally, in some drawings including FIG. 4B, the part in the image filled with a color is shown by hatching, for convenience of illustration.

Figure 5A:
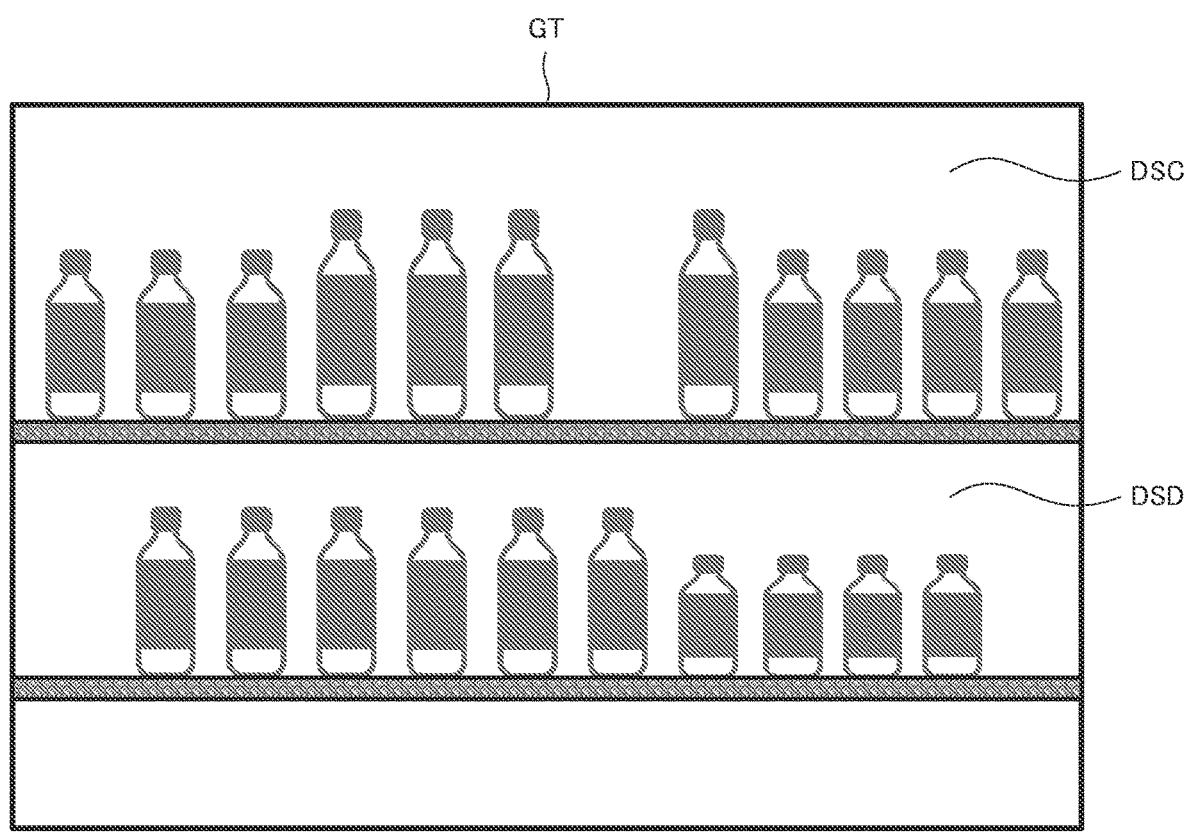
FIG. 5A is a diagram illustrating an example of a shelf allocation image used in the processing of the learning data generation device according to the first example embodiment.
Figure 5B:
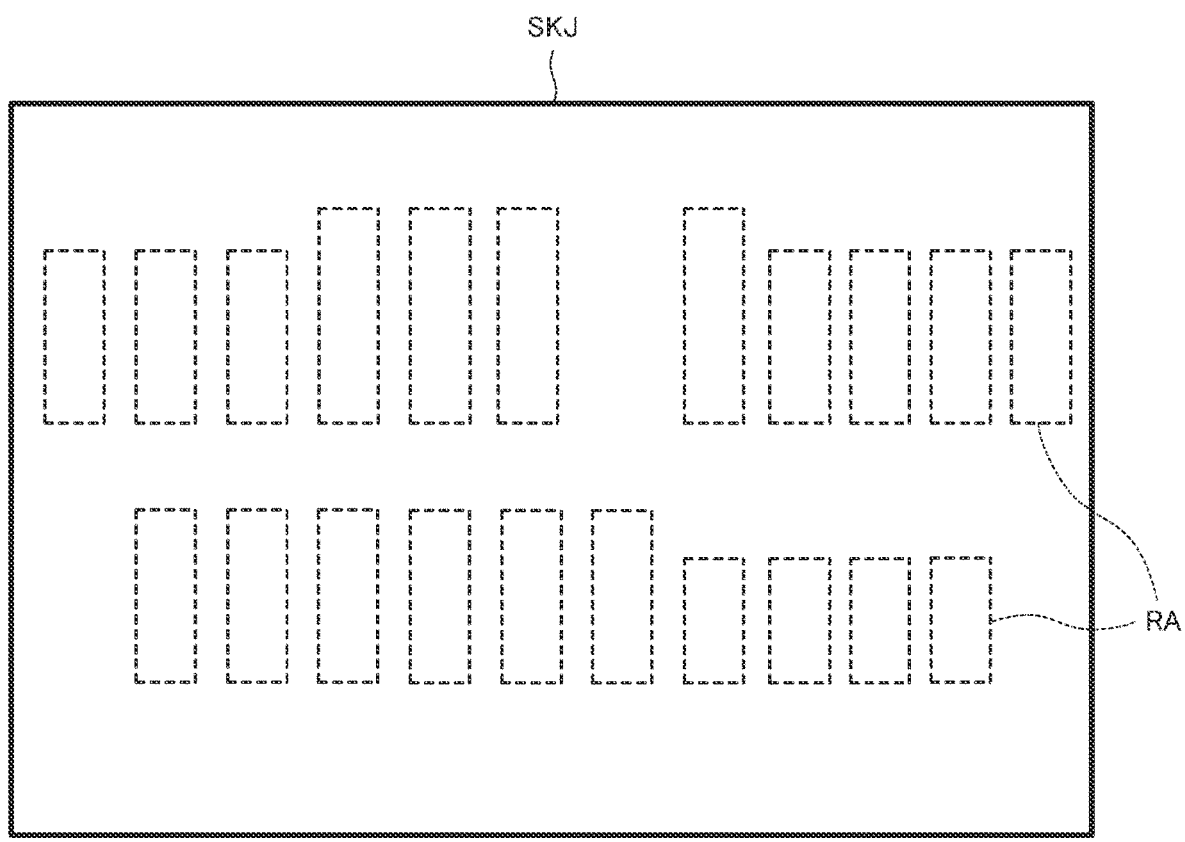
FIG. 5B is a diagram illustrating an example of rectangle information used in the processing of the learning data generation device according to the first example embodiment.

The rectangular area deformation unit 112 acquires the external data including, for example, a shelf allocation image GT as shown in FIG. 5A and a rectangle information SKJ as shown in FIG. 5B from the external data storage device 400. FIG. 5A is a diagram illustrating an example of the shelf allocation image used in the process of the learning data generation device according to the first example embodiment. FIG. 5B is a diagram illustrating an example of the rectangle information used in the process of the learning data generation device according to the first example embodiment.

The shelf allocation image GT of FIG. 5A corresponds to an image obtained by photographing a part of a product shelf provided with a horizontally long display spaces DSC and DSD, which are aligned in the vertical direction and in which a plurality of products are displayed. Further, as shown in FIG. 5B, the rectangle information SKJ includes information indicating the positions (coordinates) of a plurality of rectangular areas RA from which the position of each product arranged in the shelf allocation image GT can be specified, for example.

The rectangular area deformation unit 112 deforms each rectangular area RA included in the rectangle information SKJ to conform to the size of the background image GB on the basis of the size of the shelf allocation image GT. According to such a process, for example, each rectangular area RA included in the rectangle information SKJ is uniformly enlarged or reduced in size. The rectangular area deformation unit 112 generates the rectangle deformation information KHJ including information indicating the position (coordinates) of each of the deformed rectangular area obtained by the above-described process, and outputs the generated rectangle deformation information KHJ to the foreground deformation unit 114 and the composite image generation unit 115.

Figure 6:
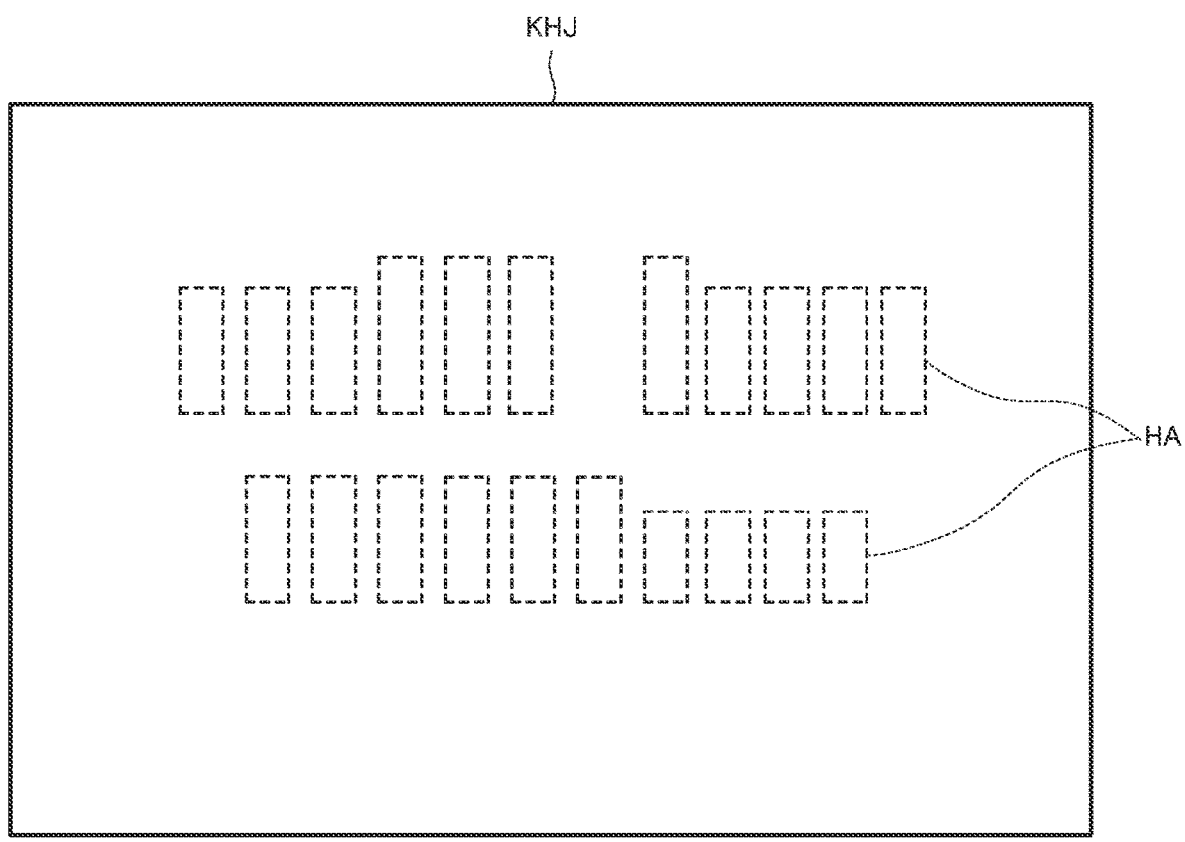
FIG. 6 is an example of rectangle deformation information generated by the processing of the learning data generation device according to the first example embodiment.

Specifically, when the size of the shelf allocation image GT is larger than the size of the background image GB, the rectangular area deformation unit 112 uniformly reduces the size of the plurality of rectangular areas RA on the basis of the size of the shelf allocation image GT, and generates the rectangle deformation information KHJ including information indicating the positions (coordinates) of the deformed rectangular areas HA as shown in FIG. 6. Then, the rectangular area deformation unit 112 outputs the rectangle deformation information KHJ including information indicating the positions (coordinates) of the rectangular areas HA as shown in FIG. 6 to the foreground deformation unit 114 and the composite image generation unit 115. FIG. 6 is a diagram illustrating an example of the rectangle deformation information generated by the process of the learning data generation device according to the first example embodiment.

The rectangular area deformation unit 112 may selectively acquire the data including the shelf allocation image GT of an aspect ratio that matches or is similar to the aspect ratio of the background image GB from among the external data stored in the external data storage device 400. When deforming the rectangular area RA into the rectangular area HA, the rectangular area deformation unit 112 may deform the rectangular area RA while maintaining the aspect ratio of the rectangular area RA or may deform the rectangular area RA by ignoring the aspect ratio of the rectangular area RA.

Figure 7A:
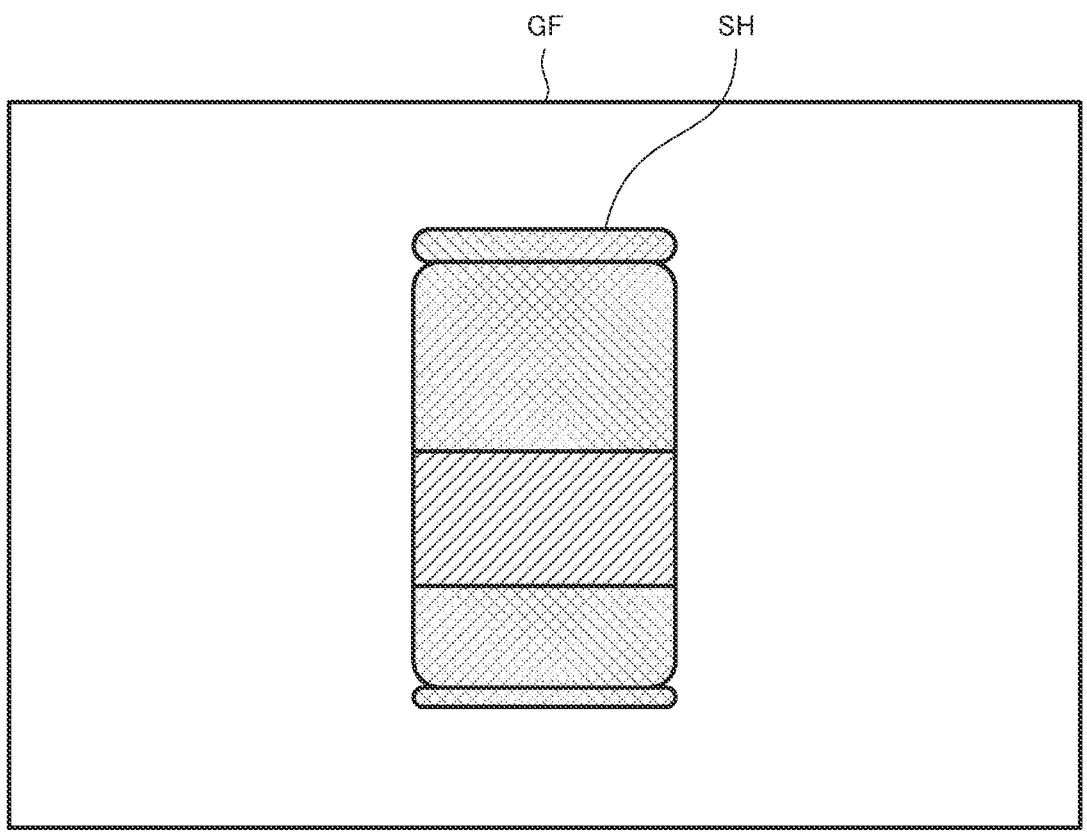
FIG. 7A is a diagram illustrating an example of a foreground image used in the processing of the learning data generation device according to the first example embodiment.
Figure 7B:
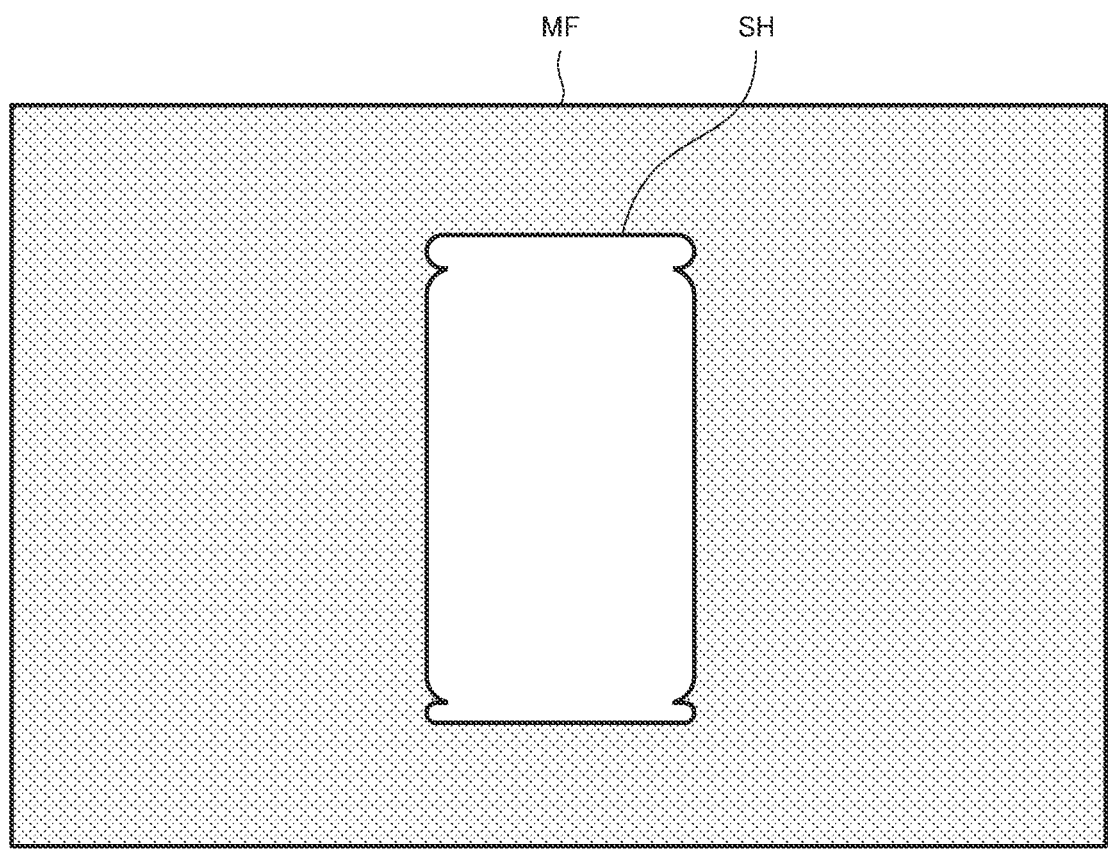
FIG. 7B is an example of a foreground mask generated by the processing of the learning data generation device according to the first example embodiment.

The foreground mask generation unit 113 acquires the foreground image GF as shown in FIG. 7A, for example, from the foreground image storage device 300, and generates the foreground mask MF as shown in FIG. 7B on the basis of the foreground image GF. The foreground mask generation unit 113 outputs the foreground image GF and the foreground mask MF to the foreground deformation unit 114. FIG. 7A is a diagram illustrating an example of the foreground image used in the process of the learning data generation device according to the first example embodiment. FIG. 7B is a diagram illustrating an example of the foreground mask generated by the process of the learning data generation device according to the first example embodiment.

The foreground image GF in FIG. 7A corresponds to an image including one product SH. In addition, the foreground mask MF in FIG. 7B corresponds to an image in which the inside of the product SH included in the foreground image GF is colored with white and the outside of the product SH is colored with a color different from white.

The foreground deformation unit 114 deforms the foreground image GF and the foreground mask MF so as to be within the rectangular area HA indicated by the rectangle deformation information KHJ acquired from the rectangular area deformation unit 112. The foreground deformation unit 114 outputs the deformed foreground image GHF and the deformed foreground mask MHF obtained by the above-described process to the composite image generation unit 115.

The deformed foreground image GHF corresponds to the image obtained by deforming the product SH included in the foreground image GF of FIG. 7A. The foreground mask MHF corresponds to the image in which the part representing the product SH included in the foreground mask MF in FIG. 7B is deformed.

As the process of deforming the foreground mask MF into the deformed foreground mask MHF, the foreground deformation unit 114 may perform a process similar to the process of deforming the foreground image GF into the deformed foreground image GHF. In addition, when the foreground image GF is deformed, the foreground deformation unit 114 may deform the foreground image GF with maintaining the aspect ratio of the foreground image GF or may deform the foreground image GF with neglecting the aspect ratio of the foreground image GF. Further, when the foreground image GF is deformed with maintaining the aspect ratio, the foreground deformation unit 114 may deform the foreground image GF using the aspect ratio set based on either the length of the short side or the length of the long side of the rectangular area HA. In addition, the foreground deformation unit 114 may extract, for example, a set of foreground image GAF and the foreground mask MAF having one aspect ratio that matches or is similar to the aspect ratio of the rectangular area HA from a plurality of sets of the foreground image GF and the foreground mask MF acquired from the foreground mask generation unit 113, and output the extracted foreground image GAF and the foreground mask MAF to the composite image generation unit 115. In addition, the foreground deformation unit 114 may randomly extract a set of the foreground image GAF and the foreground mask MAF from among ones close to the aspect ratio of the rectangular area HA in a plurality of sets of the foreground image GF and the foreground mask MF acquired from the foreground mask generation unit 113.

Figure 8A:
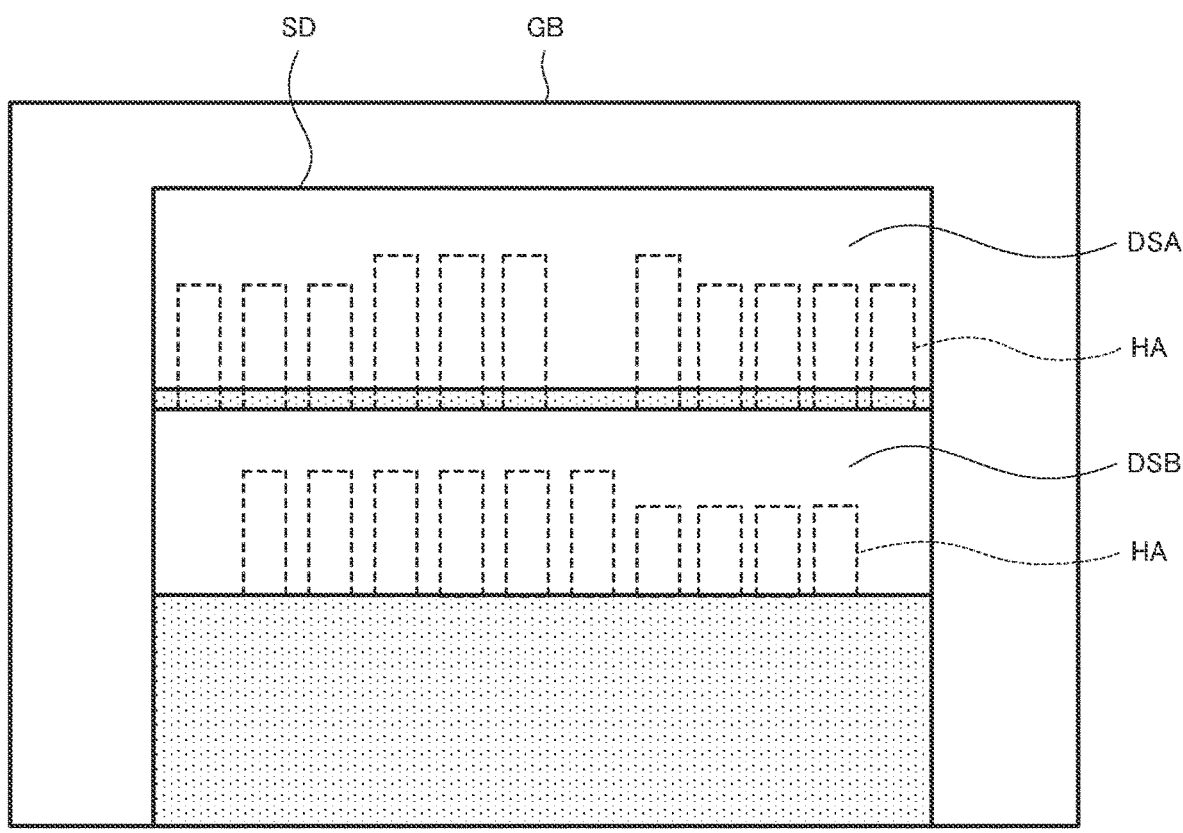
FIG. 8A shows the positions of the rectangular areas specified by the processing of the learning data generation device according to the first example embodiment.
Figure 8B:
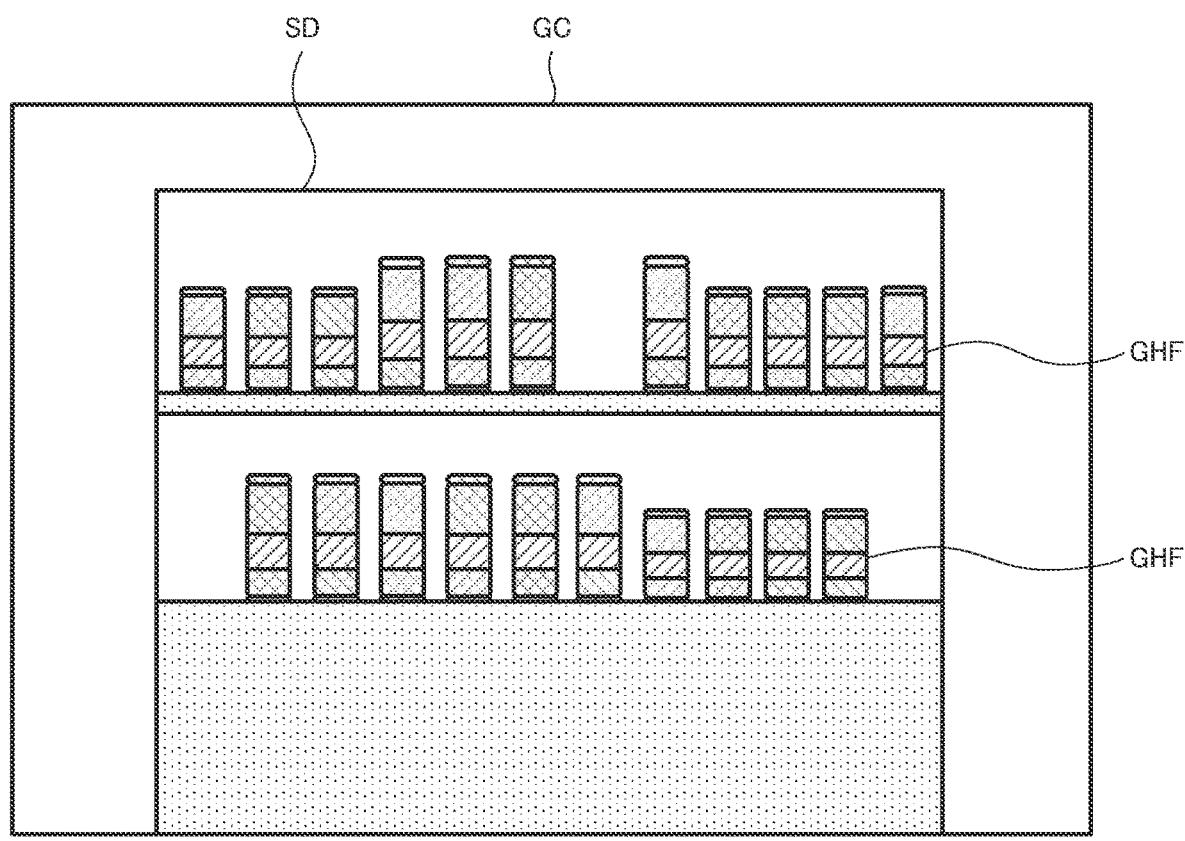
FIG. 8B is an example of a composite image generated by the processing of the learning data generation device according to the first example embodiment.
Figure 8C:
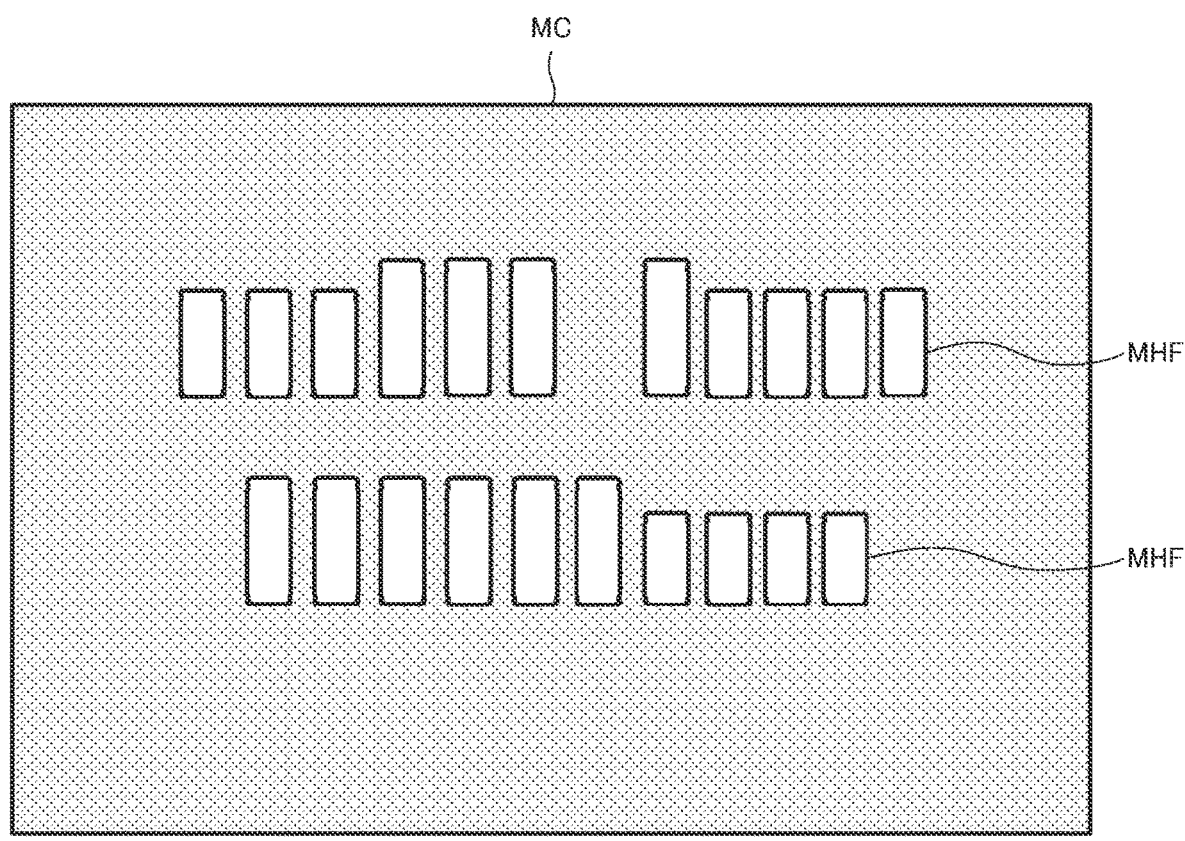
FIG. 8C is an example of a composite mask generated by the processing of the learning data generation device according to the first example embodiment.

Based on the rectangle deformation information KHJ acquired from the rectangular area deformation unit 112, the composite image generation unit 115 performs a process of specifying the positions of the plurality of rectangular areas HA in the background image GB acquired from the background mask generation unit 111 as the pasting positions of the deformed foreground images. The composite image generation unit 115 generates the composite image GC by pasting the foreground image GHF acquired from the foreground deformation unit 114 on each of the plurality of rectangular areas HA whose position in the background image GB is specified by the aforementioned process. The composite image generation unit 115 generates the composite mask MC by pasting the deformed foreground masks MHF obtained from the foreground deformation unit 114 onto the background mask MB obtained from the background mask generation unit 111. The composite image generation unit 115 outputs the composite image GC and the composite mask MC generated as described above to the rectangle information generation unit 116. Specifically, the composite image generation unit 115 specifies the positions of the plurality of rectangular areas HA in the background image GB as the positions shown in FIG. 8A, for example. The composite image generation unit 115 generates the composite image GC as shown in FIG. 8B, for example, by pasting the foreground image GHF to each of the plurality of rectangular areas HA specified as the positions shown in FIG. 8A. The composite image generation unit 115 generates the composite mask MC as shown in FIG. 8C, for example, by pasting the foreground masks MHF to the background mask MB on the basis of the pasting positions of the foreground images GHF in the composite image GC shown in FIG. 8B. FIG. 8A is a diagram illustrating the positions of the rectangular areas specified by the process of the learning data generation device according to the first example embodiment. FIG. 8B is a diagram illustrating an example of the composite image generated by the process of the learning data generation device according to the first example embodiment. FIG. 8C is a diagram illustrating an example of the composite mask generated by the process of the learning data generation device according to the first example embodiment.

The composite image GC shown in FIG. 8B is generated as an image having an arrangement state similar to the arrangement state of the products in the shelf allocation image GT shown in FIG. 5A. That is, the composite image generation unit 115 can generate the composite image GC having the arrangement state similar to the arrangement state indicated by the rectangle information SKJ by pasting the deformed foreground images GHF to the background image GB on the basis of the rectangle deformation information KHJ. The composite image generation unit 115 can generate the composite image GC having the arrangement state that matches the arrangement state of the products indicated by the rectangle informational SKJ by using the same method as that described above in a case where the product shelf included in the shelf allocation image GT and the product shelf included in the background image GB are photographed under the same photographing condition, for example.

Figure 9:
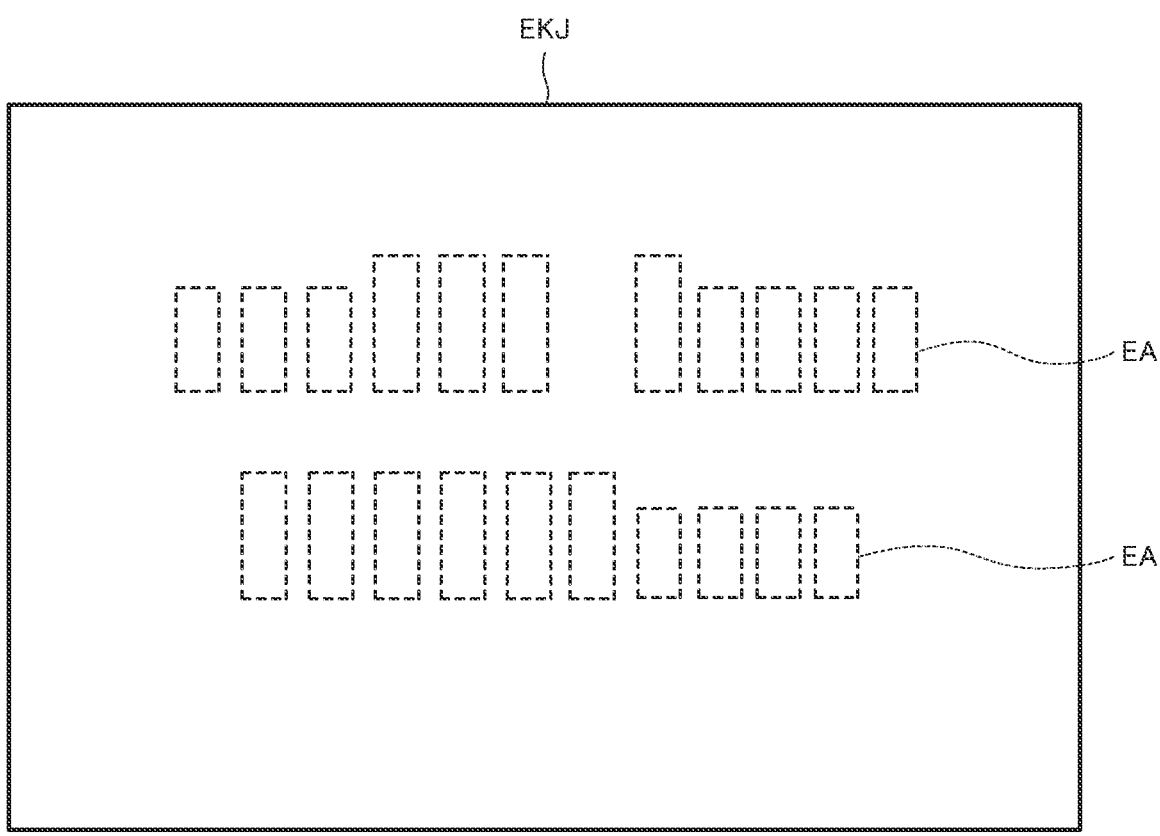
FIG. 9 is an example of the rectangle information generated by the processing of the learning data generation device according to the first example embodiment.

Based on the composite mask MC acquired from the composite image generation unit 115, the rectangle information generation unit 116 generates the rectangle information EKJ indicating the arrangement position of each product in the composite image GC acquired together with the composite mask MC as shown in FIG. 9, for example. The rectangle information generation unit 116 generates data including the composite image GC and the rectangle information EKJ as the learning data, and outputs the generated learning data to the learning data storage device 500. FIG. 9 is a diagram illustrating an example of the rectangle information generated by the process of the learning data generation device according to the first example embodiment.

The rectangle information EKJ includes information indicating the positions (coordinates) of a plurality of rectangular areas EA, i.e., information specifying the position of each product in the composite image GC. In other words, the rectangle information EKJ includes information indicating the arrangement state of the products in the composite image GC.

According to the present example embodiment, the background image with metadata may be stored in the background image storage device 200.

Specifically, for example, as the meta data of the background image, data indicating the positions of the vertexes of the polygon corresponding to the shape of the product shelf SD may be added. When such metadata is added to the background image, for example, it is possible to generate a composite image in which the deformed foreground images are pasted such that the product are arranged inside the display spaces DSA and DSB of the product shelf SD.

Further, for example, as the metadata of the background image, data indicating the position of the shelf level in the product shelf SD may be added. When such metadata is added to the background image, it is possible to generate a composite image in which the deformed foreground images are pasted so that the products are arranged along the shelf level in the product shelf SD, for example.

Further, for example, as the metadata of the background image, data indicating the arrangement positions of the products in the product shelf SD may be added. When such metadata is added to the background image, it is possible to generate a composite image in which the deformed foreground images are pasted such that the products are arranged at predetermined positions in the product shelf SD, for example.

On the other hand, according to the present example embodiment, the foreground images to which metadata is added may be stored in the foreground image storage device 300.

Specifically, for example, as the meta data of the foreground image, data indicating the rotation angle indicating the orientation of the product may be added. When such metadata is added to the foreground image, for example, at the time of pasting the deformed foreground image to the background image, the probability of pasting the image in which the direction of the product is away from the front direction can be lower than the probability of pasting the image in which the direction of the product is in in the front direction.

[Processing Flow]

Subsequently, a flow of the processing executed by the learning data generation device according to the first example embodiment will be described. FIG. is a flowchart of the processing executed by the learning data generation device according to the first example embodiment.

First, the background mask generation unit 111 generates the background mask based on the background image acquired from the background image storage device 200 (step S11), and outputs the background image and the background mask to the composite image generation unit 115.

Next, the rectangular area deformation unit 112 deforms each rectangular area included in the rectangle information of the external data to conform to the size of the background image used for generating the background mask in step S11, based on the size of the shelf allocation image of the external data acquired from the external data storage device 400 (step S12). The rectangular area deformation unit 112 generates the rectangle deformation information including information indicating the position (coordinates) of each of the deformed rectangular areas obtained in step S12, and outputs the generated rectangle deformation information to the foreground deformation unit 114 and the composite image generation unit 115.

The foreground mask generation unit 113 generates the foreground mask based on the foreground image acquired from the foreground image storage device 300 (step S13), and outputs the foreground image and the foreground mask to the foreground deformation unit 114.

Subsequently, the foreground deformation unit 114 deforms the foreground mask generated in step S13 and the foreground image used for generating the foreground mask to fit within the deformed rectangular area indicated by the rectangle deformation information (step S14). The foreground deformation unit 114 outputs the deformed foreground image and the deformed foreground mask to the composite image generation unit 115.

Subsequently, the composite image generation unit 115 specifies the position of each of the deformed rectangular areas in the background image based on the rectangle deformation information (step S15), and generates the composite image by pasting the deformed foreground image to each of the deformed rectangular areas (step S16). The composite image generation unit 115 generates the composite mask by pasting the deformed foreground mask to the background mask by referring to the pasting position of the deformed foreground image in the composite image (step S16). The composite image generation unit 115 outputs the composite image and the composite mask to the rectangle information generation unit 116.

The rectangle information generation unit 116 generates the rectangle information corresponding to the composite image used for generating the composite mask on the basis of the composite mask generated in step S16 (step S17). The rectangle information generation unit 116 generates data including the composite image generated in step S16 and the rectangle information generated in step S17 as the learning data (step S18), and outputs the generated learning data to the learning data storage device 500.

As described above, according to the present example embodiment, it is possible to generate a composite image in which the products are arranged in the display state similar to the display state of the products in the shelf allocation image of the external data, and it is possible to generate the learning data including the composite image. Further, according to the present example embodiment, it is possible to deform the rectangular areas included in the rectangle information of the external data, deform the foreground image to have a size and/or an aspect ratio corresponding to the deformed rectangular areas, and generate the composite image using the deformed foreground image. Therefore, according to the present example embodiment, it is possible to efficiently construct a learning model that is used for analyzing the shelf allocation of products.

[Modification]

Hereinafter, modifications to the above example embodiment will be described. For the sake of simplicity, a specific description of the part to which the processing already described can be applied shall be omitted as necessary.

(First Modification)

The foreground image stored in the foreground image storage device 300 is not limited to an image of an actual product, and may be, for example, an image of an unreal product generated by a learned image generation model. The image generation model can be constructed as a part of a GAN (Generative Adversarial Network) capable of performing learning according to the determination results obtained by performing a true-false determination while alternately inputting an image of an actual product and an image of an unreal product, for example. In addition, the image generation model may be configured to simultaneously generate the RGB image and the a-channel image, that can be used instead of the foreground mask, as the image of the unreal product. The image generation model may be constructed as part of a Conditional GAN that can learn, for example, the meta information of the product category. Then, according to the learned image generation model constructed as a part of Conditional GAN, it is possible to generate an image of an unreal product corresponding to a desired category such as a category corresponding to the type of the product shelf.

The composite image generation unit 115 may generate the composite image using only the image of the unreal product as the deformed foreground image to be pasted to the background image. The composite image generation unit 115 may generate the composite image by selectively using the image of the real product and the image of the unreal product as the deformed foreground image to be pasted to the background image.

As described above, according to the first modification, it is possible to generate a composite image including an unreal product, and it is possible to generate learning data including the composite image. Therefore, according to this modification, it is possible to construct a learning model that can correspond to both the existing products and unreleased products that will be put on sale in the future as the variation of the existing products, for example, as a learning model that is utilized for analyzing the shelf allocation of products.

(Second Modification)

Figure 11:
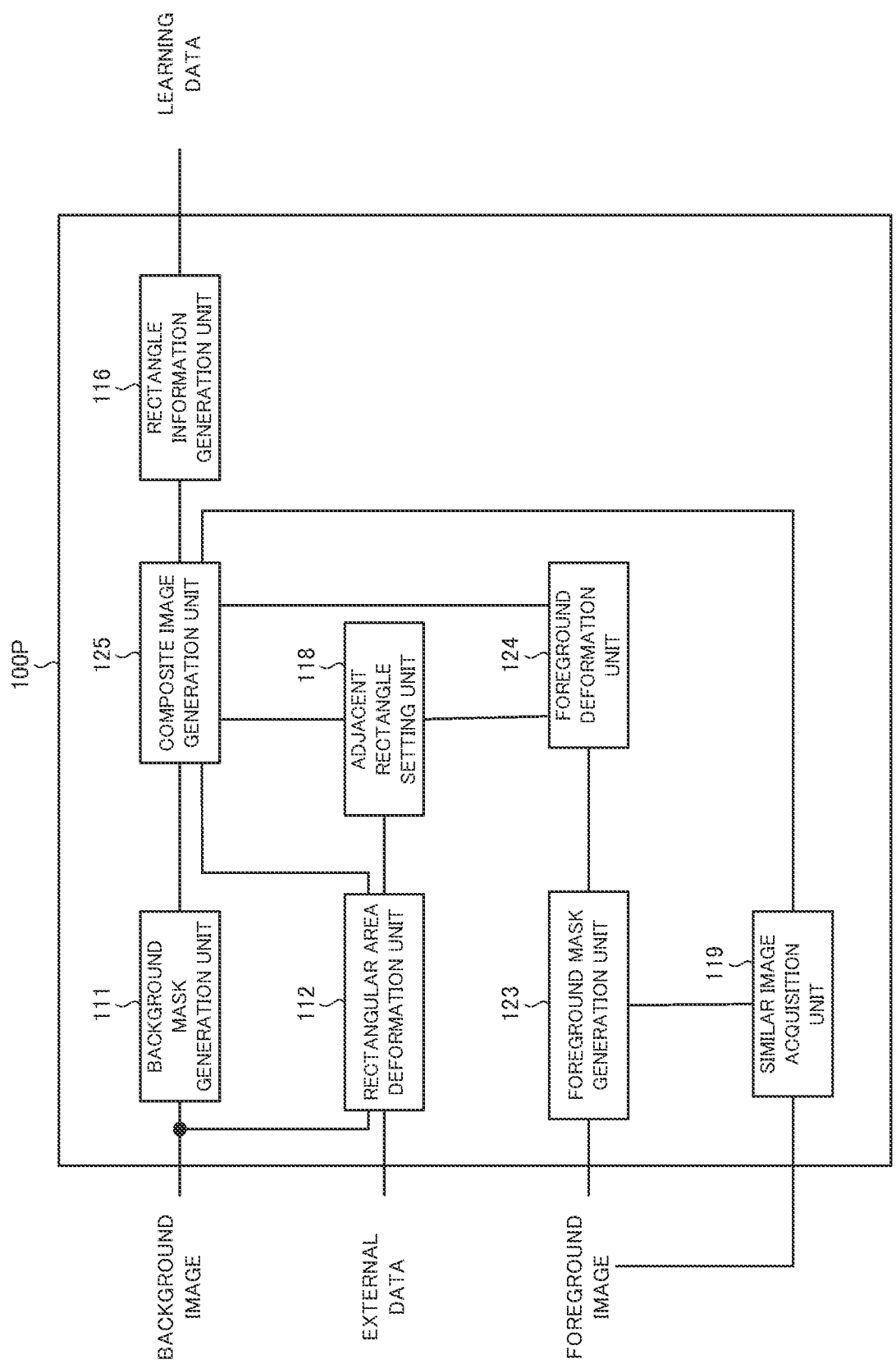
FIG. 11 is a block diagram illustrating a functional configuration of a learning data generation device according to a modification of the first example embodiment.

FIG. 11 is a block diagram illustrating a functional configuration of a learning data generation device according to a second modification of the first example embodiment.

The learning data generation device 100P has a hardware configuration similar to the learning data generation device 100. As shown in FIG. 11, the learning data generation device 100P includes a background mask generation unit 111, a rectangular area deformation unit 112, a foreground mask generation unit 123, a foreground deformation unit 124, a composite image generation unit 125, a rectangle information generation unit 116, an adjacent rectangle setting unit 118, and a similar image acquisition unit 119.

The adjacent rectangle setting unit 118 sets one deformed rectangular area included in the rectangle deformation information acquired from the rectangular area deformation unit 112, as the rectangular area at a position adjacent to the position where the deformed foreground image has already been pasted (the next pasting position of the deformed foreground image) at the time of generation of the composite image by the composite image generation unit 125. The adjacent rectangle setting unit 118 outputs the rectangle setting information, which indicates the one rectangular area set as described above, to the foreground deformation unit 124 and the composite image generation unit 125. When the deformed foreground image is pasted to the first pasting position, the adjacent rectangle setting unit 118 outputs the rectangle setting information indicating the one deformed rectangular area corresponding to the first pasting position included in the rectangle deformation information acquired from the rectangular area deformation unit 112 to the foreground deformation unit 124 and the composite image generation unit 125.

The similar image acquisition unit 119 acquires a foreground image similar to the deformed foreground image already pasted at the time of generation of the composite image by the composite image generation unit 125 from the foreground image storage device 300, and outputs the acquired foreground image to the foreground mask generation unit 123. It is noted that the similar image acquisition unit 119 does not acquire the foreground image from the foreground image storage device 300 when the deformed foreground image is pasted to the first pasting position.

The foreground mask generation unit 123 generates the foreground mask based on the foreground image acquired from the foreground image storage device 300, and outputs the foreground image and the foreground mask to the foreground deformation unit 124. Also, the foreground mask generation unit 123 generates the foreground mask based on the foreground image acquired from the similar image acquisition unit 119, and outputs the foreground image and the foreground mask to the foreground deformation unit 124.

The foreground deformation unit 124 deforms the foreground image and the foreground mask acquired from the foreground mask generation unit 123 so as to be within the one deformed rectangular area indicated by the rectangle setting information acquired from the adjacent rectangle setting unit 118. The image to be deformed by the foreground deformation unit 124 includes the foreground image acquired from the foreground image storage device 300 and the foreground image acquired from the similar image acquisition unit 119. The foreground deformation unit 124 outputs the deformed foreground image and the deformed foreground mask obtained by the above-described processing to the composite image generation unit 125.

The composite image generation unit 125 executes processing for specifying the positions of the deformed rectangular areas in the background image acquired from the background mask generation unit 111 as the pasting positions of the deformed foreground images on the basis of the rectangle deformation information acquired from the rectangular area deformation unit 112. The composite image generation unit 125 replaces the deformed rectangular area at the pasting position with the one deformed rectangular area indicated by the rectangle setting information acquired from the adjacent rectangle setting unit 118. It is noted that, at the first pasting position, the deformed rectangular area indicated by the rectangle deformation information acquired from the rectangular area deformation unit 112 is the same as the one deformed rectangular area indicated by the rectangle setting information acquired from the adjacent rectangle setting unit 118. The composite image generation unit 125 generates the composite image by pasting the deformed foreground image acquired from the foreground deformation unit 124 to the deformed rectangular areas. The composite image generation unit 125 generates the composite mask by pasting the deformed foreground mask obtained from the foreground deformation unit 124 onto the background mask obtained from the background mask generation unit 111. The pasting positions of the deformed foreground mask in the background mask are set to the same positions as the pasting positions of the deformed foreground image in the composite image. The composite image generation unit 125 outputs the composite image and the composite mask generated as described above to the rectangle information generation unit 116. Subsequently, a specific example of the processing executed by the learning data generation device according to the second modification will be described.

Figure 10:
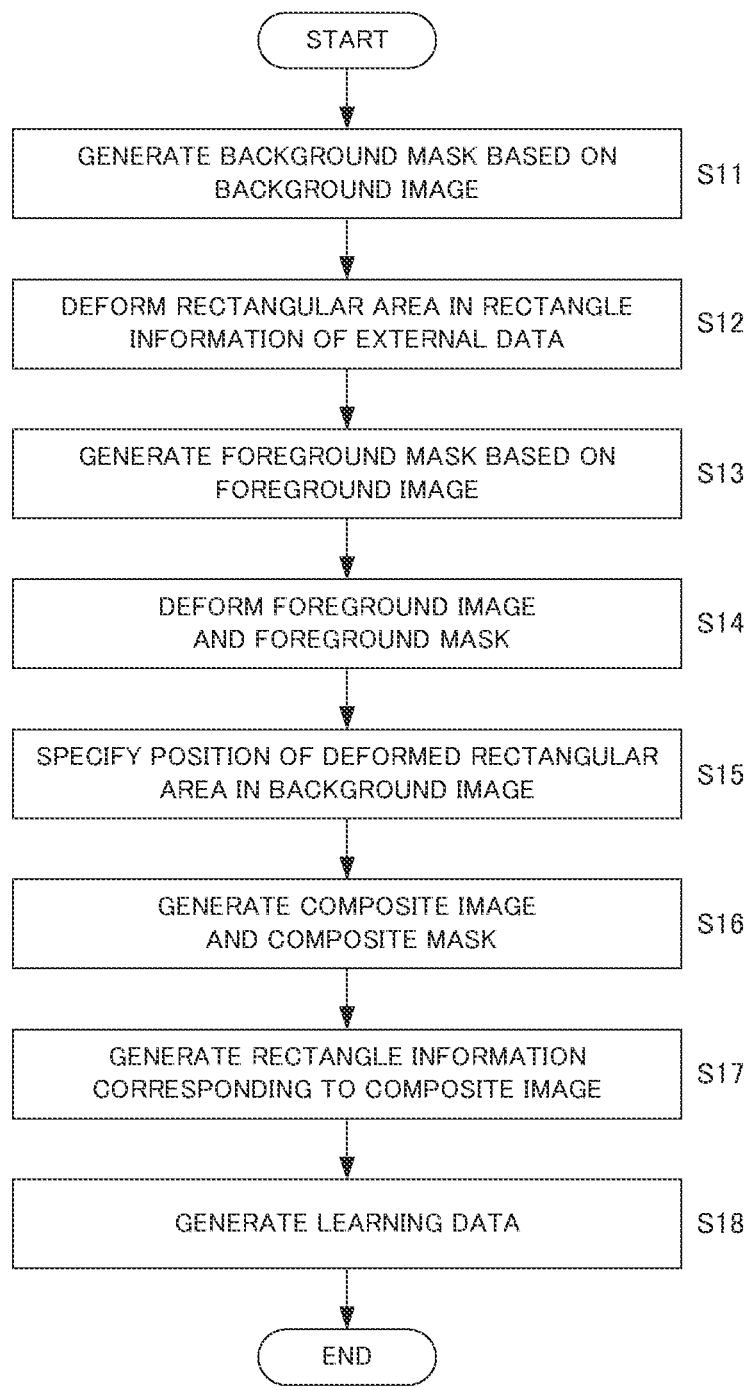
FIG. 10 is a flowchart for explaining the processing executed by the learning data generation device according to the first example embodiment.

The adjacent rectangle setting unit 118 sets any one of the deformed rectangular areas HAP included in the rectangle deformation informational KHJ as the rectangular area of the next pasting position of the deformed foreground image. The adjacent rectangle setting unit 118 outputs the rectangle setting information KSJ indicating the rectangle area HAP thus set, to the foreground deformation unit 124 and the composite image generation unit 125. The processing of the adjacent rectangle setting unit 118 may be executed, for example, between the time immediately after step S12 and the time immediately before step S14 in the processing flowchart of FIG. 10.

The similar image acquisition unit 119 acquires the foreground image GFQ similar to the deformed foreground image already pasted at the time of generating the composite image by the composite image generation unit 125 from the foreground image storage device 300, and outputs the acquired foreground image GFP to the foreground mask generation unit 123.

Incidentally, when JAN (Japanese Article Number) code is added as the metadata of the foreground image, the similar image acquisition unit 119 may acquire the image of the same code as the JAN code from the foreground image storage device 300 as the foreground image GFQ, for example. Further, when JAN code is added as the metadata of the foreground image, the similar image acquisition unit 119 may acquire the image of the product belonging to the category similar to the product of the deformed foreground image already pasted at the time of generating the composite image by the composite image generation unit 125 from the foreground image storage device 300 as the foreground image GFQ based on the search result obtained by searching a database such as a JICFS (JAN Item Code File Service) using the JAN code. In addition, the similar image acquisition unit 119 may acquire the foreground image GFQ having the feature similar to the feature of the deformed foreground image that have already been pasted at the time of generating the composite image by the composite image generation unit 125 from the foreground image storage device 300, for example.

The foreground mask generation unit 123 generates a foreground mask MFP based on the foreground image GFP acquired from the foreground image storage device 300, and outputs the foreground image GFP and the foreground mask MFP to the foreground deformation unit 124. The foreground mask generation unit 123 generates a foreground mask MFQ based on the foreground image GFQ acquired from the similar image acquisition unit 119, and outputs the foreground image GFQ and the foreground mask MFQ to the foreground deformation unit 124.

The foreground deformation unit 124 deforms the foreground image GFP and the foreground mask MFP so as to be within the rectangular area indicated by the rectangle setting information acquired from the adjacent rectangle setting unit 118. The foreground deformation unit 124 outputs the deformed foreground image GHFP and the deformed foreground mask MHFP obtained by the above-described process to the composite image generation unit 125. The foreground deformation unit 124 deforms the foreground image GFQ and the foreground mask MFQ so as to be within the rectangular area indicated by the rectangle setting information acquired from the adjacent rectangle setting unit 118. The foreground deformation unit 124 outputs the deformed foreground image GHFQ and the deformed foreground masking MHFQ obtained by the above-described process to the composite image generation unit 125.

Figure 12:
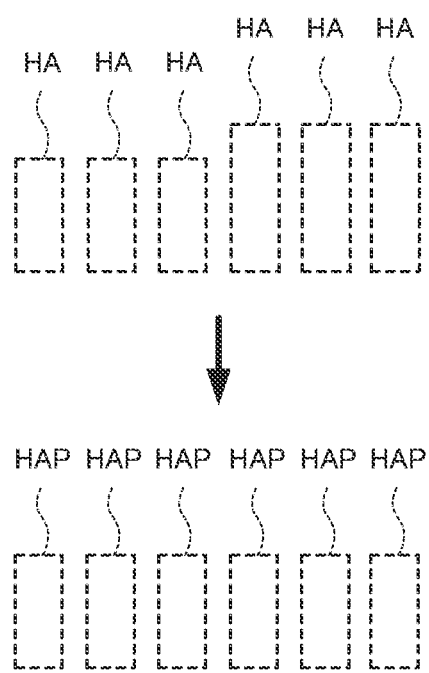
FIG. 12 is a diagram illustrating an example of processing executed by the learning data generation device according to the modification of the first example embodiment.
Figure 13A:
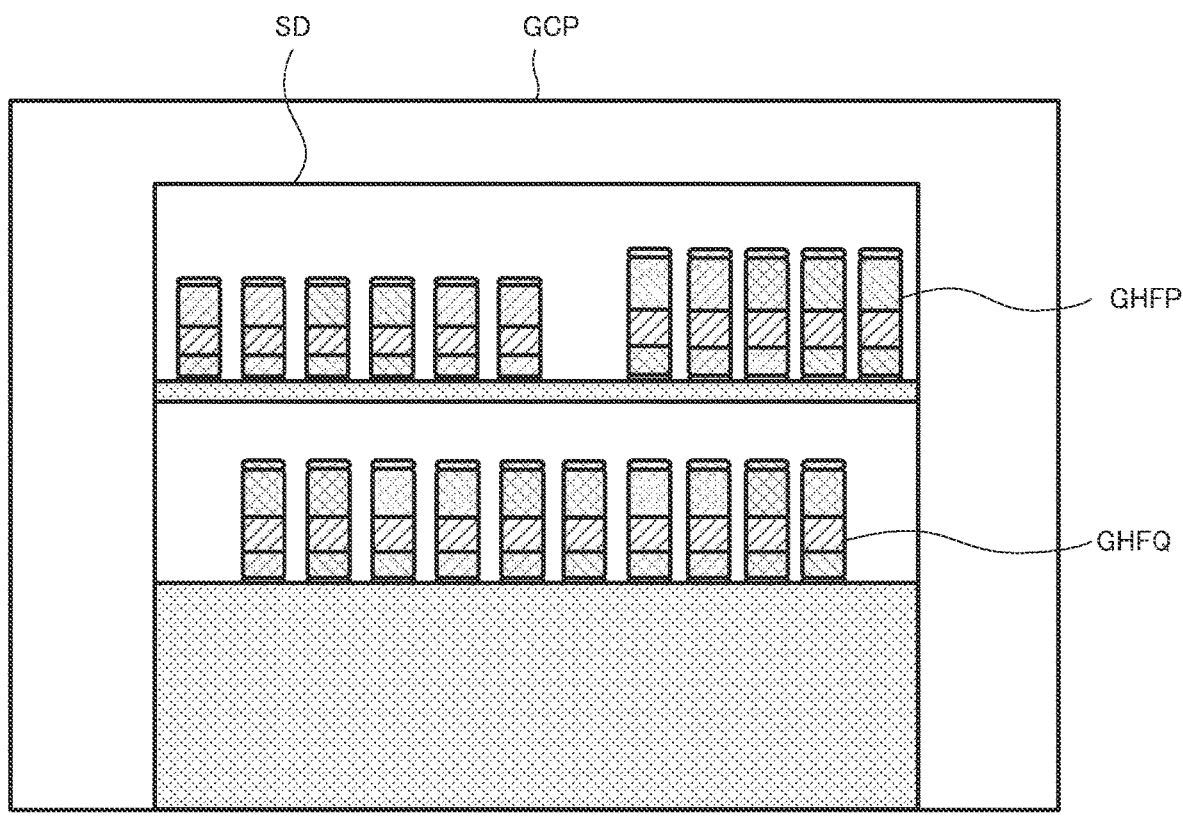
FIG. 13A is an example of a composite image generated by the processing of the learning data generation device according to the modification of the first example embodiment.
Figure 13B:
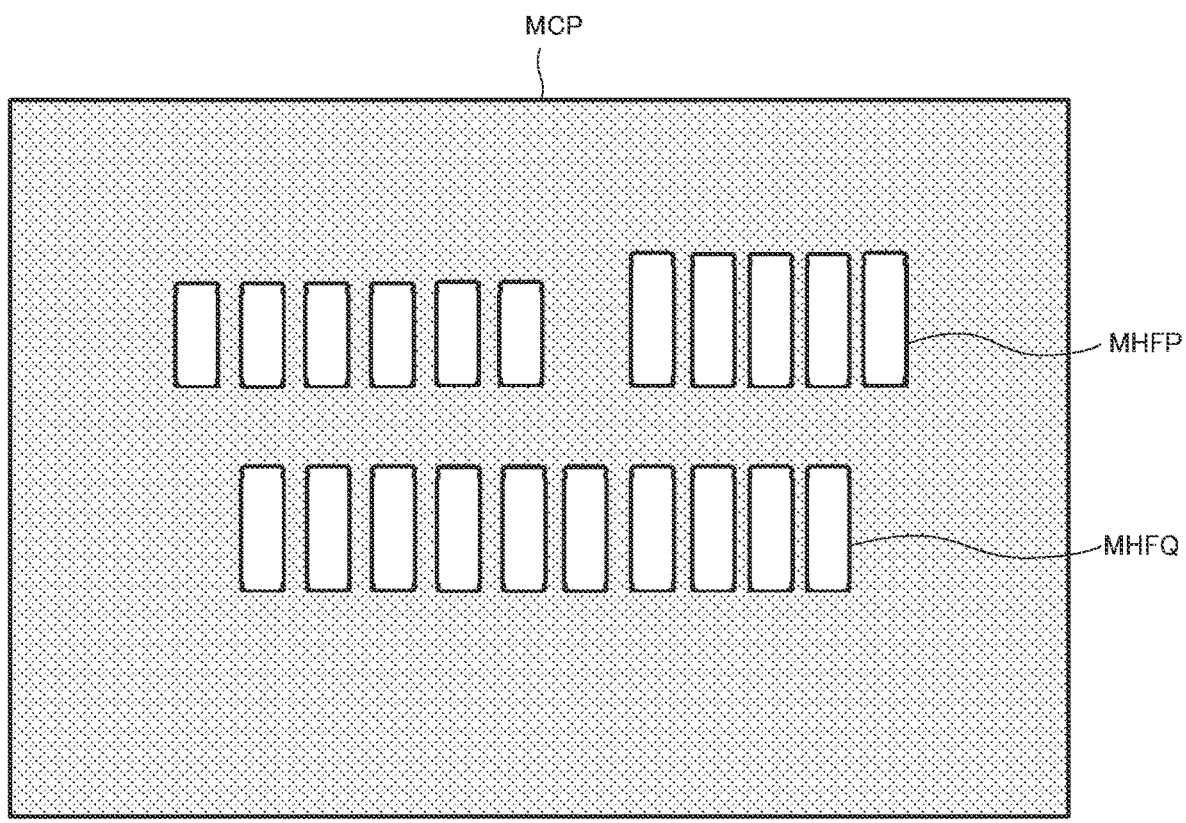
FIG. 13B is an example of a composite mask generated by the processing of the learning data generation device according to the modification of the first example embodiment.

Based on the rectangle deformation information KHJ acquired from the rectangular area deformation unit 112, the composite image generation unit 125 specifies the positions of the plurality of rectangular areas HA in the background image GB acquired from the background mask generation unit 111 as the pasting positions of the deformed foreground images. The composite image generation unit 125 replaces the deformed rectangular area HA at the pasting position with the deformed rectangular area HAP indicated by the rectangle setting information KSJ acquired from the adjacent rectangle setting unit 118. In the first pasting position, for example, the replacement is made such that the rectangular area HA indicated by the rectangle deformation information KHJ coincides with the rectangular area HAP indicated by the rectangle setting information KSJ. According to the above process, a plurality of rectangular areas HA having different sizes to each other in the rectangle deformation informational KHJ can be replaced with a plurality of rectangular areas HAP having the same size as each other as shown in FIG. 12, for example. FIG. 12 is a diagram illustrating an example of processing executed by the learning data generation device according to the modification of the first example embodiment. The composite image generation unit 125 selectively pastes the deformed foreground image GHFP and the deformed foreground image GHFQ acquired from the foreground deformation unit 124 to the rectangular area HAP, and thereby generates the composite image GCP illustrated in FIG. 13A. In addition, the composite image generation unit 125 generates a composite mask MCP as illustrated in FIG. 13B by pasting the deformed foreground mask MHFP and the deformed foreground mask MHFQ acquired from the foreground deformation unit 124 onto the background mask MB. The composite image generation unit 125 outputs the composite image GCP and the composite mask MCP thus generated, to the rectangle information generation unit 116. FIG. 13A is a diagram illustrating an example of the composite image generated by the process of the learning data generation device according to the second modification of the first example embodiment. FIG. 13B is a diagram illustrating an example of the composite mask generated by the process of the learning data generation device according to the second modification of the first example embodiment.

The composite image GCP of FIG. 13A is generated as an image having the arrangement state similar to the arrangement state of the products in the shelf allocation image GT of FIG. 5A. That is, the composite image generation unit 125 can generate the composite image GCP having the arrangement state similar to the arrangement state indicated by the rectangle information SKJ by selectively pasting the deformed foreground image GHFP and the deformed foreground image GHFQ to the background image GB on the basis of the rectangle deformation information KHJ and the rectangle setting information KSJ.

Figure 14:
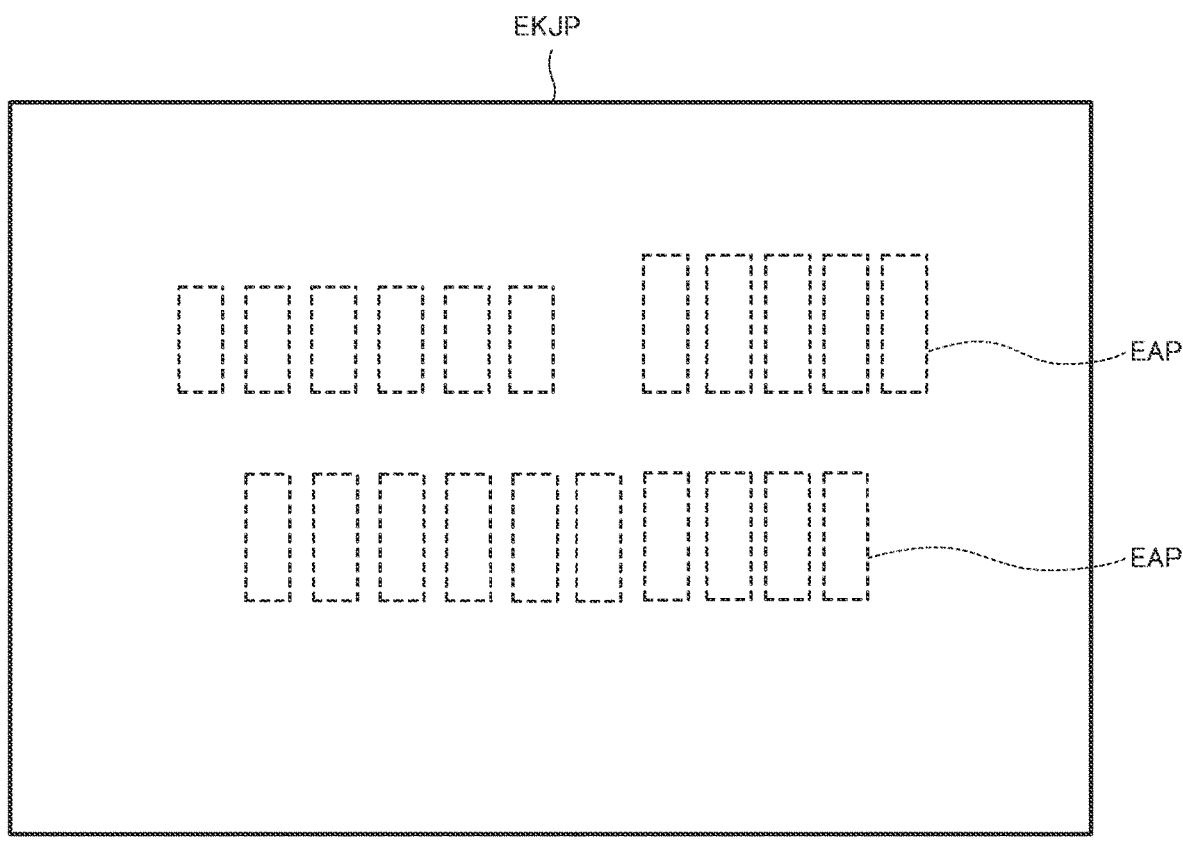
FIG. 14 is a diagram illustrating an example of the rectangle information generated by the processing of a learning data generation device according to the modification of the first example embodiment.

Based on the composite mask MCP acquired from the composite image generation unit 125, the rectangle information generation unit 116 generates the rectangle information EKJP indicating the arrangement position of each product in the composite image GCP acquired together with the composite mask MCP as shown in FIG. 14, for example. The rectangle information generation unit 116 generates data including the composite image GCP and the rectangle information EKJP as the learning data, and outputs the generated learning data to the learning data storage device 500. FIG. 14 is a diagram illustrating an example of the rectangle information generated by the process of the learning data generation device according to the second modification of the first example embodiment;

The rectangle information EKJP includes information indicating the positions (coordinates) of a plurality of rectangular areas EAP which are information that can specify the position of each product in the composite image GCP. In other words, the rectangle information EKJP includes information indicating the arrangement state of the products in the composite image GCP.

As described above, according to the second modification, for example, it is possible to generate a composite image in which products are arranged in a display state close to a display state of a real store, e.g., the products similar to each other are arranged in the positions close to each other, and it is possible to generate the learning data including the composite image. Therefore, according to the second modification, it is possible to efficiently construct a learning model that is used for analysis of shelf allocation of products.

Second Example Embodiment

[System Configuration]

Figure 15:
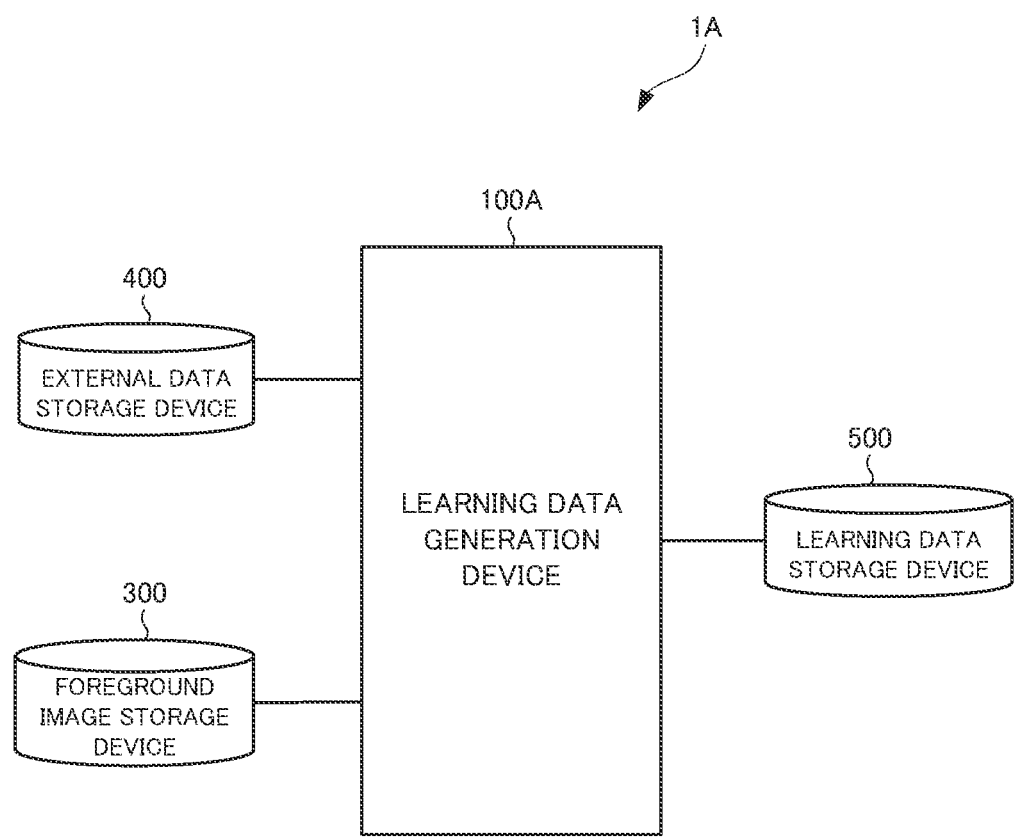
FIG. 15 is a diagram illustrating an example of a configuration of a data processing system including a learning data generation device according to a second example embodiment.

FIG. 15 is a diagram illustrating an example of a configuration of a data processing system including a learning data generation device according to a second example embodiment. As shown in FIG. 15, the data processing system 1A includes a learning data generation device 100A, a foreground image storage device 300, an external data storage device 400, and a learning data storage device 500.

The learning data generation device 100A generates learning data based on the background image acquired from the background image storage device 200, the foreground image acquired from the foreground image storage device 300, and the external data acquired from the external data storage device 400, and outputs the generated learning data to the learning data storage device 500.

[Hardware Configuration]

The learning data generation device 100A has a hardware configuration similar to the learning data generation device 100.

[Function Configuration]

Figure 16:
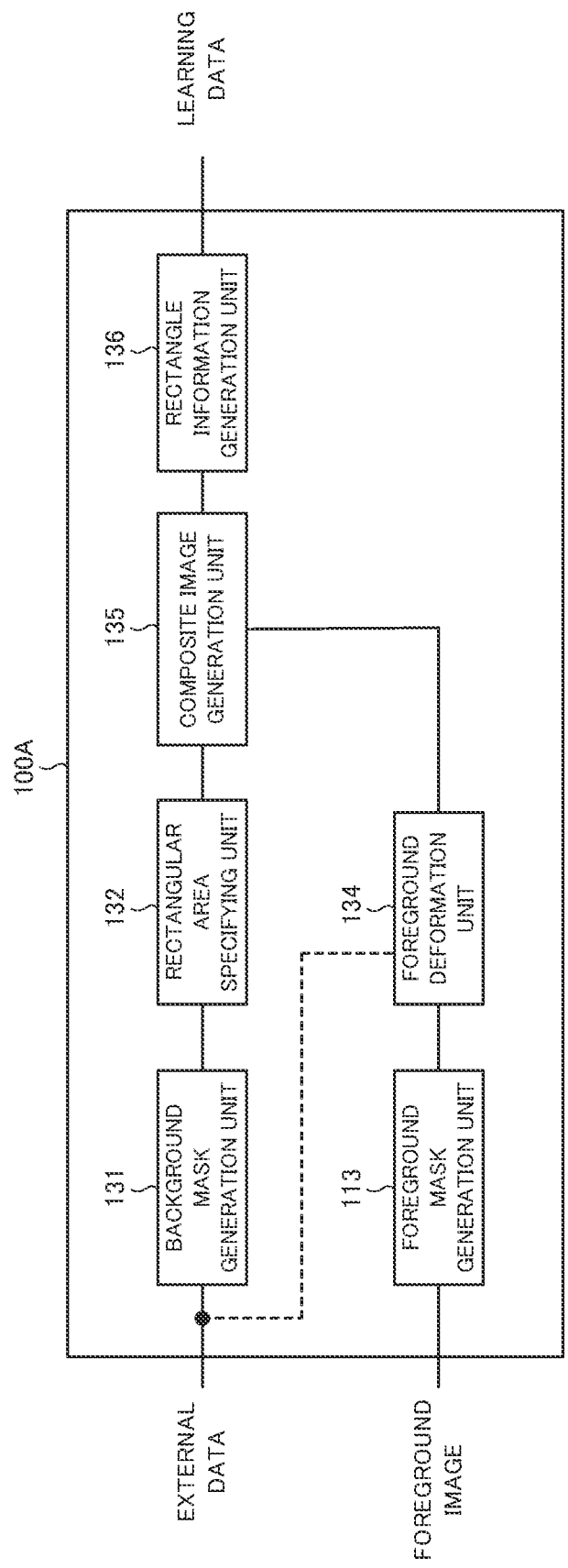
FIG. 16 is a block diagram illustrating a functional configuration of a learning data generation device according to the second example embodiment.

FIG. 16 is a block diagram illustrating a functional configuration of a learning data generation device according to the second example embodiment.

As shown in FIG. 16, the learning data generation device 100A includes a background mask generation unit 131, a rectangular area specifying unit 132, a foreground mask generation unit 113, a foreground deformation unit 134, a composite image generation unit 135, and a rectangle information generation unit 136.

The background mask generation unit 131 generates a background mask on the basis of the shelf allocation image of the external data acquired from the external data storage device 400, and outputs the shelf allocation image, the rectangle information of the external data, and the background mask to the rectangular area specifying unit 132. The background mask is generated, for example, as an image in which the entire area of the shelf allocation image is filled with a predetermined color such as black.

Based on the background mask and the rectangle information acquired from the background mask generation unit 131, the rectangular area specifying unit 132 generates the rectangular area information which is information capable of specifying the positions in the background mask to which each of the rectangular areas in the rectangle information corresponds. The rectangular area specifying unit 132 outputs the background mask to which the rectangular area information is added and the shelf allocation image to the composite image generation unit 135.

The foreground deformation unit 134 deforms the foreground image and the foreground mask acquired from the foreground mask generation unit 113, and outputs the deformed foreground image and the deformed foreground mask to the composite image generation unit 135.

The composite image generation unit 135 sets each rectangular area specified on the basis of the rectangular area information added to the background mask acquired from the rectangular area specifying unit 132 as an exclusion area to be excluded from the candidates of pasting the deformed foreground image in the shelf allocation image. In addition, the composite image generation unit 135 generates the composite image by pasting the deformed foreground image to the areas other than the exclusion area set as described above, in the shelf allocation image acquired from the rectangular area specifying unit 132. The composite image generation unit 135 generates the composite mask by pasting the deformed foreground mask obtained from the foreground deformation unit 134 onto the background mask obtained from the rectangular area specifying unit 132. The pasting positions of the deformed foreground mask in the background mask are set to the same positions as the pasting positions of the deformed foreground images in the composite image. The composite image generation unit 135 outputs the composite image generated as described above and the composite mask to which the rectangular area information similar to the background mask is added, to the rectangle information generation unit 136.

The rectangle information generation unit 136 generates rectangle information corresponding to information indicating the arrangement position of one or a plurality of products in the composite image acquired together with the composite mask, on the basis of the composite mask acquired from the composite image generation unit 135 and the rectangular area information added to the composite mask. The rectangle information generated by the rectangle information generation unit 136 includes information indicating the position (coordinates) of one or a plurality of rectangular areas having a shape to surround the periphery of the product in the composite image. That is, the rectangle information generated by the rectangle information generation unit 136 corresponds to the information obtained by adding the rectangular area calculated on the basis of the composite mask to the rectangle information of the external data acquired by the background mask generation unit 131. The rectangle information generated by the rectangle information generation unit 136 includes information indicating the arrangement state of the products in the composite image. The rectangle information generation unit 136 generates data including the composite image acquired from the composite image generation unit 135 and the rectangle information generated as described above as the learning data, and outputs the generated learning data to the learning data storage device 500.

[Specific Example of Processing Executed by the Learning Data Generation Device]

Next, description will be given of the specific example of the processing executed by the learning data generation device according to the second example embodiment.

The background mask generation unit 131 acquires the shelf allocation image GT as shown in FIG. 5A, for example, from the external data storage device 400, and then generates the background mask MBA similar to the background mask MB shown in FIG. 4B by filling the entire shelf allocation image GT with a predetermined color. The background mask generation unit 131 outputs the shelf allocation image GT shown in FIG. 5A, the rectangle information SKJ shown in FIG. 5B, and the background mask MBA shown in FIG. 17 to the rectangular area specifying unit 132.

Based on the background mask MBA and the rectangle information SKJ acquired from the background mask generation unit 131, the rectangular area specific unit 132 generates the rectangular area information KRJ which is information capable of specifying the positions in the background mask MBA to which each of the rectangular areas included in the rectangle information SKJ corresponds. The rectangular area specifying unit 132 outputs the background mask MBA to which the rectangular area informational KRJ is added and the shelf allocation image GT to the composite image generation unit 135.

Figure 17:
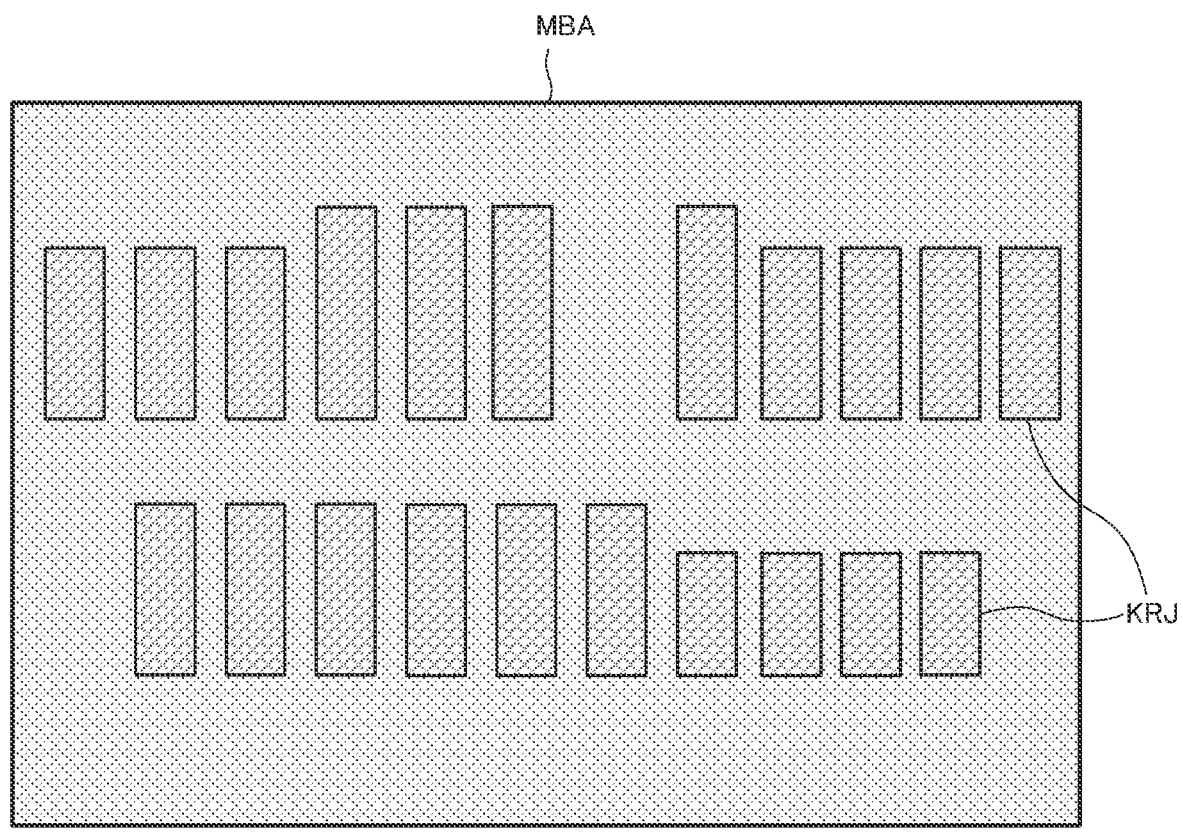
FIG. 17 is an example of the rectangular area information generated by the processing of the learning data generation device according to the second example embodiment.

For example, as shown in FIG. 17, the rectangular area information KRJ is the information generated by filling the positions of the rectangular areas included in the rectangle information SKJ with a color different from the color of the background mask MBA. FIG. 17 is a diagram illustrating an example of the rectangular area information generated by the processing of the learning data generation device according to the second example embodiment.

The foreground deformation unit 134 deforms the foreground image GF shown in FIG. 7A and the foreground mask MF shown in FIG. 7B acquired from the foreground mask generation unit 113, and outputs the deformed foreground image GHFA and the deformed foreground mask MHFA to the composite image generation unit 135.

As the process of deforming the foreground mask MF to the foreground mask MHFA, the foreground deformation unit 134 may execute the process similar to the process of deforming the foreground image GF to the foreground image GHFA. In addition, the foreground deformation unit 134 may use an arbitrary deformation method as the deformation method of deforming the foreground image GF to the foreground image GHFA. Specifically, the foreground deformation unit 134 may deform the foreground image GF such that the average size of the deformed foreground image GHFA matches the average size of a plurality of rectangular areas included in the rectangle information SKJ, for example. The foreground deformation unit 134 may deform the foreground image GF such that the size of the deformed foreground image GHFA becomes equal to or smaller than the largest size in the plurality of rectangular areas included in the rectangle informational SKJ, for example. The foreground deformation unit 134 may deform the foreground image GF such that the size of the deformed foreground image GHFA becomes equal to or larger than the smallest size in the plurality of rectangular areas included in the rectangle informational SKJ.

The composite image generation unit 135 sets the respective areas specified on the basis of the rectangular area informational KRJ added to the background masking MBA as the exclusion areas to be excluded from the pasting candidates of the deformed foreground image GHFA in the shelf allocation image GT. The composite image generation unit 135 generates the composite image GCA by pasting the deformed foreground image GHFA to the areas other than the exclusion areas in the shelf allocation image GT. The composite image generation unit 135 generates the composite mask MCA by pasting the deformed foreground mask MHFA acquired from the foreground deformation unit 134 onto the background mask MBA acquired from the rectangular area specifying unit 132. The composite image generation unit 135 outputs the composite image GCA generated as described above and the composite mask MCA to which the rectangular area information KRJ similar to the background mask MBA is added, to the rectangle information generation unit 136.

Figure 18A:
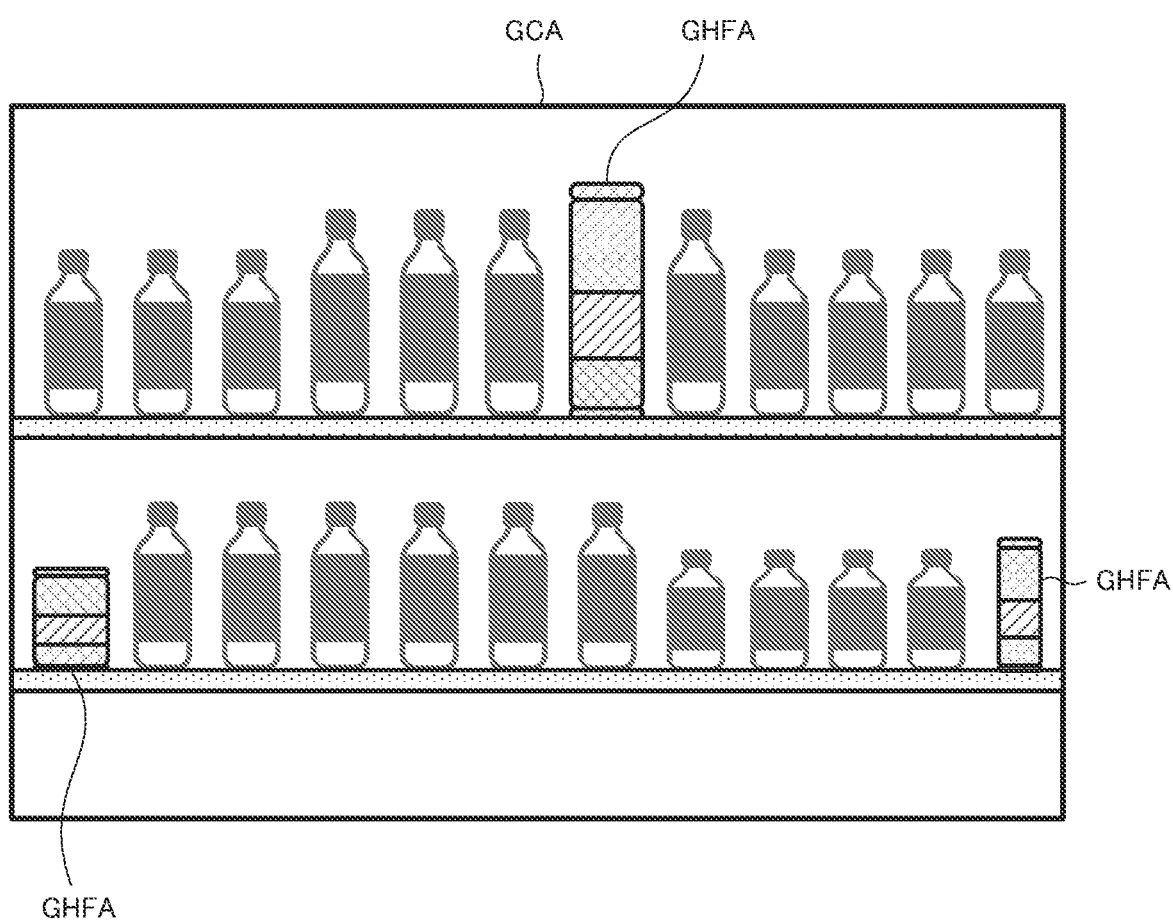
FIG. 18A is an example of a composite image generated by the processing of the learning data generation device according to the second example embodiment.
Figure 18B:
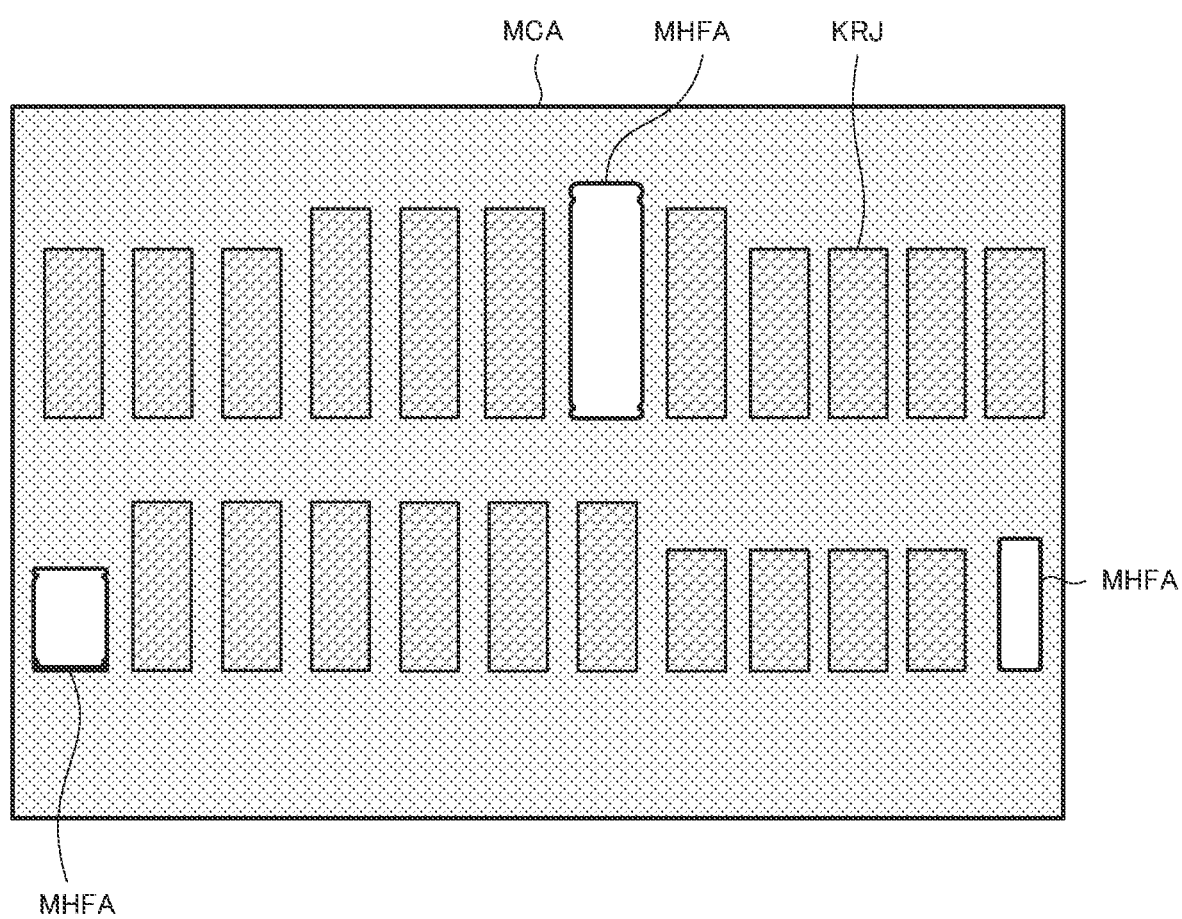
FIG. 18B is an example of a composite mask generated by the processing of the learning data generation device according to the second example embodiment.

Specifically, the composite image generation unit 135 generates the composite image GCA as shown in FIG. 18A by pasting the deformed foreground images GHFA to the areas other than the exclusion areas in the shelf allocation image GT. The composite image generation unit 135 generates the composite mask MCA as shown in FIG. 18B, for example, by pasting the deformed foreground masks MHFA to the background mask MBA on the basis of the pasting positions of the foreground images GHFA in the composite image GCA as shown in FIG. 18A. FIG. 18A is a diagram illustrating an example of the composite image generated by the process of the learning data generation device according to the second example embodiment. FIG. 18B is a diagram illustrating an example of the composite mask generated by the process of the learning data generation device according to the second example embodiment.

The composite image GCA shown in FIG. 18A is generated as an image having an arrangement state similar to the arrangement state of the products in the shelf allocation image GT shown in FIG. 5A. That is, the composite image generation unit 135 can generate the composite image GCA having the arrangement state similar to the arrangement state indicated by the rectangle information SKJ by pasting the deformed foreground images GHFA to the shelf allocation image GT on the basis of the rectangular area information KRJ.

The composite image generation unit 135 is not limited to the one which sets all the rectangular areas identified based on the rectangular area information KRJ as the exclusion areas. For example, the composite image generation unit 135 may set one or more rectangular areas selected from all the rectangular areas identified based on the rectangular area information KRJ as the exclusion areas. When all of the rectangular areas included in the rectangular area informational KRJ are set as the exclusion areas, the composite image generation unit 135 pastes the deformed foreground image GHFA at the positions other than the arrangement positions of the products in the shelf allocation image GT. In addition, when a part of the rectangular areas included in the rectangular area informational KRJ is set as the exclusion areas, the composite image generation unit 135 may paste the deformed foreground image GHFA at the arrangement positions of the products in the shelf allocation image GT.

The rectangle information generation unit 136 generates the rectangle information EKJA corresponding to information indicating an arrangement positions of one or a plurality of products in the composite image GCA, based on the composite mask MCA and the rectangular area information KRJ added to the composite mask MCA. The rectangle information generation unit 136 generates data including the composite image GCA and the rectangle information EKJA as the learning data, and outputs the generated learning data to the learning data storage device 500.

Figure 19:
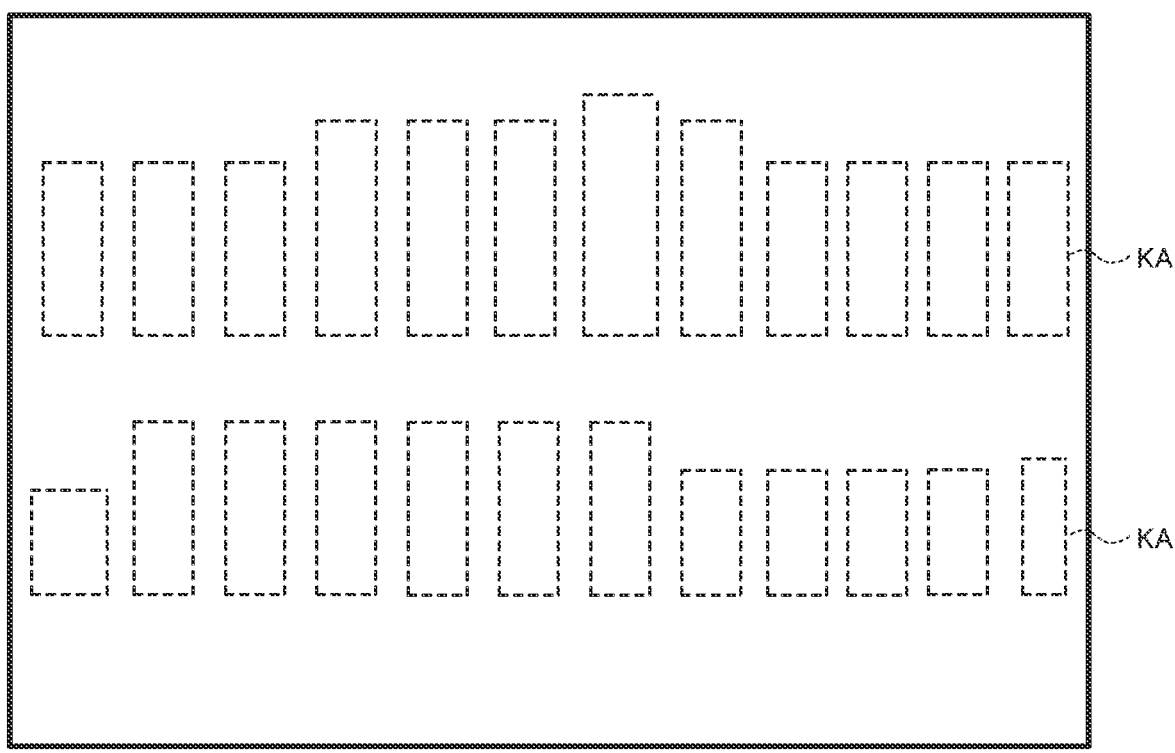
FIG. 19 is an example of the rectangle information generated by the processing of the learning data generation device according to the second example embodiment.

For example, the rectangle information EKJA includes information indicating the positions (coordinates) of a plurality of rectangular areas KA, which is the information capable of specifying which position in the composite image GCA each product is disposed, as shown in FIG. 19. In other words, the rectangle information EKJA includes information indicating the arrangement state of the products in the composite image GCA. FIG. 19 is a diagram illustrating an example of the rectangle information generated by the process of the learning data generation device according to the second example embodiment.

[Processing Flow]

Figure 20:
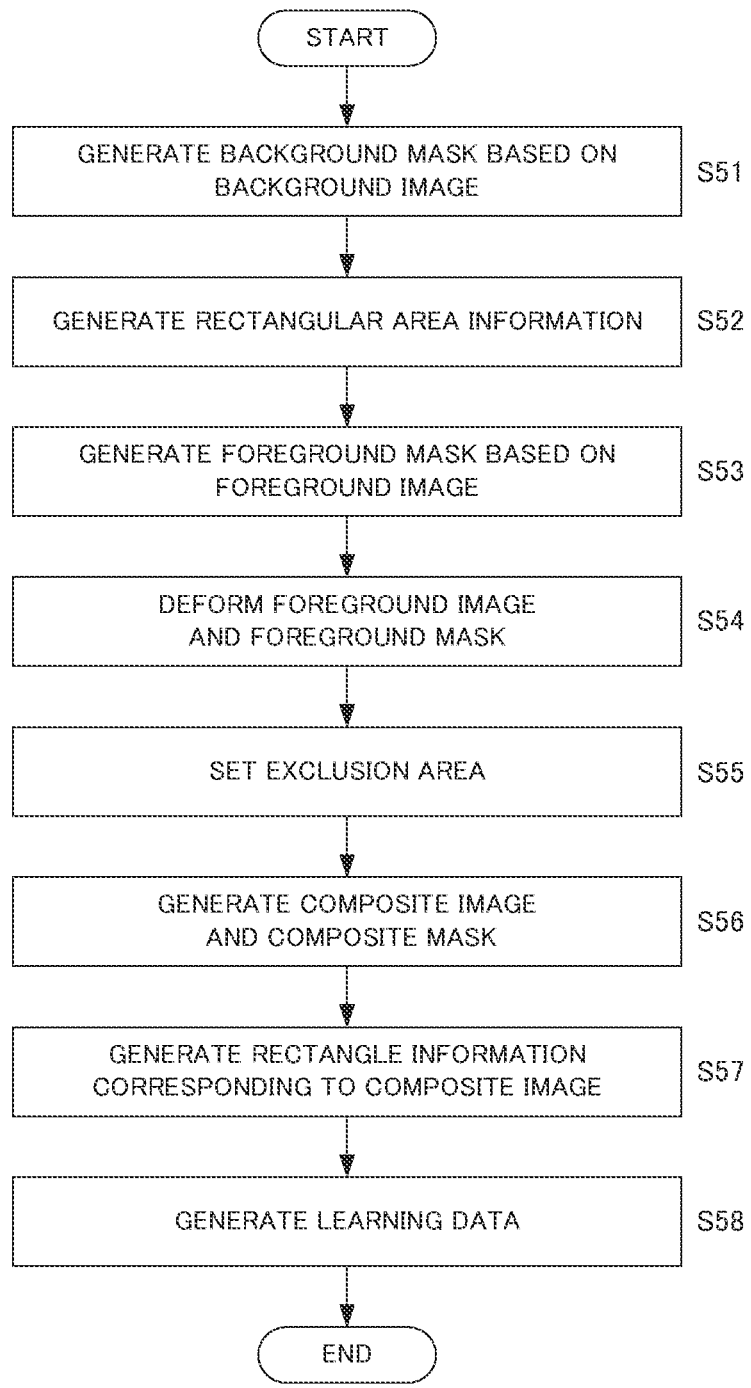
FIG. 20 is a flowchart for explaining the processing executed by the learning data generation device according to the second example embodiment.

Subsequently, a flow of processing executed by the learning data generation device according to the second example embodiment will be described. FIG. 20 is a flowchart for explaining processing executed by the learning data generation device according to the second example embodiment.

First, the background mask generation unit 131 generates the background mask based on the shelf allocation image of the external data acquired from the external data storage device 400 (step S51), and outputs the shelf allocation image, the rectangle information of the external data, and the background mask to the rectangular area specifying unit 132.

Next, the rectangular area specifying unit 132 generates the rectangular area information on the basis of the background mask and the rectangle information acquired from the background mask generation unit 131 (step S52).

The foreground mask generation unit 113 generates the foreground mask based on the foreground image acquired from the foreground image storage device 300 (step S53), and outputs the foreground image and the foreground mask to the foreground deformation unit 134.

Subsequently, the foreground deformation unit 134 performs a process of deforming the foreground mask generated in step S53 and the foreground image used for generating the foreground mask (step S54). The foreground deformation unit 134 outputs the deformed foreground image and the deformed foreground mask to the composite image generation unit 135.

Subsequently, the composite image generation unit 135 sets the exclusion areas based on the rectangular area informational KRJ added to the background mask MBA (step S55), and generates the composite image by pasting the deformed foreground image to the areas other than the exclusion areas (step S56). The composite image generation unit 135 generates the composite mask by pasting the deformed foreground mask to the background mask by referring to the pasting positions of the deformed foreground images in the composite image (step S56). The composite image generation unit 135 outputs the composite image and the composite mask to the rectangle information generation unit 136.

The rectangle information generation unit 136 generates the rectangle information corresponding to the composite image used for generating the composite mask on the basis of the composite mask generated in step S56 and the rectangular area information added to the composite mask (step S57). The rectangle information generation unit 136 generates the data including the composite image generated in step S56 and the rectangle information generated in step S57 as the learning data, and outputs the generated learning data to the learning data storage device 500 (step S58).

As described above, according to this example embodiment, it is possible to generate the composite image by diverting the actual display state of the products indicated by the shelf allocation image and generate the learning data including the composite image. Further, according to the present example embodiment, even when a background image photographing an empty product shelf is not prepared, the composite image can be generated. Further, according to the present example embodiment, even if there is one product for which the arrangement position cannot be specified from the rectangle information among the products included in the shelf allocation image, for example, it is possible to generate the composite image in which the deformed foreground image is pasted at the position of the one product. In other words, according to this example embodiment, it is possible to generate the learning data in which False-negative included in the external data is replaced with True-positive. Therefore, according to the present example embodiment, it is possible to efficiently construct a learning model that is used for analysis of shelf allocation of products.

[Modification]

The foreground image stored in the foreground image storage device 300 is not limited to an image of an actual product, and may be, for example, an image of an unreal product generated by a learned image generation model. The image generation model can be constructed as a part of a GAN capable of performing learning according to the determination results obtained by performing a true-false determination while alternately inputting the images of actual products and the images of unreal products, for example. In addition, the image generation model may be configured to simultaneously generate the RGB image and the a-channel image that can be used instead of the foreground mask, as the image of the unreal product. In addition, the image generation model may be constructed as part of a Conditional GAN that can learn, for example, the meta information of the product category. Then, according to the learned image generation model constructed as a part of Conditional GAN, it is possible to generate an image of an unreal product corresponding to a desired category such as a category corresponding to the type of the product shelf.

The composite image generation unit 135 may generate the composite image using only the image of the unreal product as the deformed foreground image to be pasted to the background image. The composite image generation unit 135 may generate the composite image by selectively using the image of the real product and the image of the unreal product as the deformed foreground image to be pasted to the background image.

As described above, according to the first modification, it is possible to generate a composite image including an unreal product, and it is possible to generate learning data including the composite image. Therefore, according to this modification, it is possible to construct a learning model that can correspond to both the existing products and unreleased products that will be put on sale in the future as the variation of the existing products, for example, as a learning model that is utilized for analyzing the shelf allocation of products.

Third Example Embodiment

Figure 21:
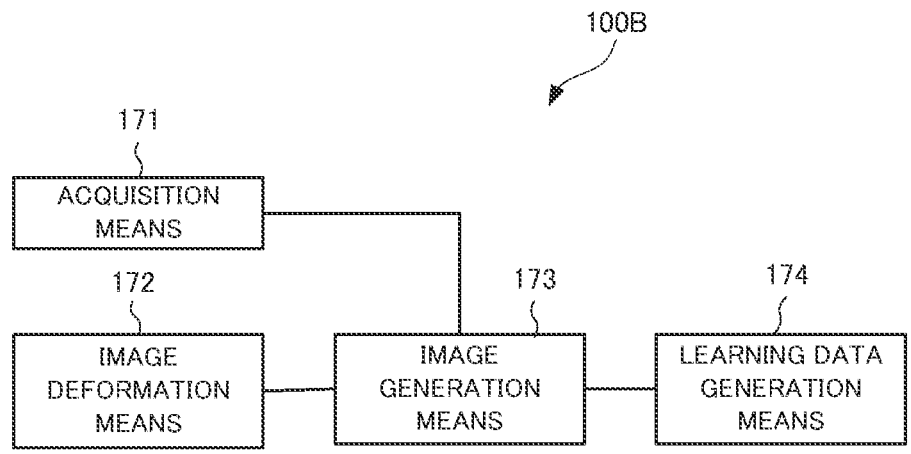
FIG. 21 is a block diagram illustrating a functional configuration of a learning data generation device according to a third example embodiment.

FIG. 21 is a block diagram illustrating a functional configuration of a learning data generation device according to the third example embodiment.

The learning data generation device 100B according to the present example embodiment has the same hardware configuration as the learning data generation device 100. The learning data generation device 100B includes an acquisition means 171, an image deformation means 172, an image generation means 173, and a learning data generation means 174.

Figure 22:
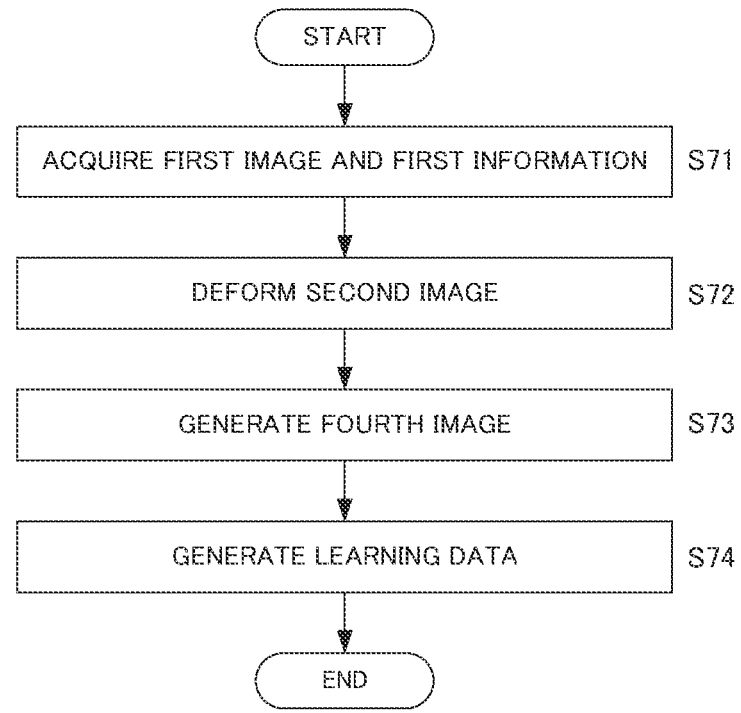
FIG. 22 is a flowchart for explaining processing executed by the learning data generation device according to the third example embodiment.

FIG. 22 is a flowchart for explaining processing executed by the learning data generation device according to the third example embodiment.

The acquisition means acquires a first image corresponding to an image obtained by photographing one or more objects arranged in a predetermined arrangement state, and first information corresponding to information indicating the predetermined arrangement state in the first image (step S71).

The image deformation means deforms a second image corresponding to an image of a desired object (step S72).

The image generation means generates a fourth image having an arrangement state that matches or is similar to the predetermined arrangement state indicated by the first image, by pasting a deformed second image to the first image or a third image corresponding to the image of a position where the desired object is arranged (step S73).

The learning data generation means generates data including the fourth image and second information corresponding to the information indicating the arrangement state of the object in the fourth image, as learning data (step S74).

According to the present example embodiment, it is possible to efficiently construct a learning model that is used for analyzing shelf allocation of products.

A part or all of the example embodiments described above may also be described as the following supplementary notes, but not limited thereto.

(Supplementary Note 1)

A learning data generation device comprising:

an acquisition means configured to acquire a first image corresponding to an image obtained by photographing one or more objects arranged in a predetermined arrangement state, and first information corresponding to information indicating the predetermined arrangement state in the first image;

an image deformation means configured to deform a second image corresponding to an image of a desired object;

an image generation means configured to generate a fourth image having an arrangement state that matches or is similar to the predetermined arrangement state indicated by the first image, by pasting a deformed second image to the first image or a third image corresponding to the image of a position where the desired object is arranged; and a learning data generation means configured to generate data including the fourth image and second information corresponding to the information indicating the arrangement state of the object in the fourth image, as learning data.

(Supplementary Note 2)

The learning data generation device according to Supplementary note 1, wherein the acquisition means acquires, as the first information, information indicating one or more rectangular areas of a shape to surround a periphery of the object arranged in the predetermined arrangement state, wherein the image deformation means deforms the second image so as to fit within a deformed rectangular area which is deformed to conform to a size of the third image, and wherein the image generation means generates the fourth image by pasting the deformed second image to the third image.

(Supplementary Note 3)

The learning data generation device according to Supplementary note 2, wherein the image deformation means deforms the second image while maintaining an aspect ratio of the second image.

(Supplementary Note 4)

The learning data generation device according to Supplementary note 3, wherein the image deformation means deforms the second image using the aspect ratio set based on a length of a short side or a long side of the deformed rectangular area.

(Supplementary Note 5)

The learning data generation device according to Supplementary note 2, wherein the image deformation means acquires the second image of a first aspect ratio that matches or is similar to the aspect ratio of the deformed rectangular area, instead of deforming the second image, and wherein the image generation means generates the fourth image by pasting the second image of the first aspect ratio to the third image.

(Supplementary Note 6)

The learning data generation device according to Supplementary note 2, wherein the second image includes a fifth image which is an image similar to the deformed second image already pasted at the time of generating the fourth image, wherein the image deformation means deforms the fifth image so as to fit within the deformed rectangular area, and wherein the image generation means generates the fourth image by pasting a deformed fifth image at a position adjacent to the deformed second image already pasted at the time of generating the fourth image.

(Supplementary Note 7)

The learning data generation device according to Supplementary note 1, wherein the acquisition means acquires, as the first information, information indicating one or plural rectangular areas of a shape to surround a periphery of the object arranged in the predetermined arrangement state, and wherein the image generation means generates the fourth image by pasting the deformed second image to an area other than the rectangular area in the first image.

(Supplementary Note 8)

The learning data generation device according to Supplementary note 7, wherein the image deformation means deforms the second image such that an average size of the deformed second images matches an average size of the plural rectangular areas.

(Supplementary Note 9)

The learning data generation device according to Supplementary note 7, wherein the image deformation means deforms the second image such that a size of the deformed second image is equal to or smaller than a largest size in the plural rectangular areas.

(Supplementary Note 10)

The learning data generation device according to Supplementary note 7, wherein the image deformation means deforms the second image such that a size of the deformed second image is equal to or larger than a smallest size in the plural rectangular areas.

(Supplementary Note 11)

The learning data generation device according to any one of Supplementary notes 1 to 7, wherein the second image includes an image of a real object and an image of an unreal object.

(Supplementary Note 12)

A learning data generation method comprising:

acquiring a first image corresponding to an image obtained by photographing one or more objects arranged in a predetermined arrangement state, and first information corresponding to information indicating the predetermined arrangement state in the first image;

deforming a second image corresponding to an image of a desired object;

generating a fourth image having an arrangement state that matches or is similar to the predetermined arrangement state indicated by the first image, by pasting a deformed second image to the first image or a third image corresponding to the image of a position where the desired object is arranged; and generating data including the fourth image and second information corresponding to the information indicating the arrangement state of the object in the fourth image, as learning data.

(Supplementary Note 13)

A recording medium recording a program, the program causing a computer to a processing comprising:

acquiring a first image corresponding to an image obtained by photographing one or more objects arranged in a predetermined arrangement state, and first information corresponding to information indicating the predetermined arrangement state in the first image;

deforming a second image corresponding to an image of a desired object;

generating a fourth image having an arrangement state that matches or is similar to the predetermined arrangement state indicated by the first image, by pasting a deformed second image to the first image or a third image corresponding to the image of a position where the desired object is arranged; and generating data including the fourth image and second information corresponding to the information indicating the arrangement state of the object in the fourth image, as learning data.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

This application is based upon and claims the benefit of priority from Japanese Patent Application 2022-88198, filed on May 31, 2022, the disclosure of which is incorporated herein in its entirety by reference.

DESCRIPTION OF SYMBOLS

100 Learning data generation device
111 Background mask generation unit
112 Rectangular area deformation unit
113 Foreground mask generation unit
114 Foreground deformation unit
115 Composite image generation unit
116 Rectangle information generation unit

The invention claimed is:

1. A learning data generation device comprising:
a memory configured to store instructions; and
one or more processors configured to execute the instructions to:
acquire a first image corresponding to an image obtained by photographing one or more objects arranged in a predetermined arrangement state, and first information corresponding to information indicating the predetermined arrangement state in the first image;
deform a second image corresponding to an image of a desired object;
generate a fourth image having an arrangement state that matches or is similar to the predetermined arrangement state indicated by the first image, by pasting a deformed second image to the first image or a third image corresponding to the image of a position where the desired object is arranged; and
generate data including the fourth image and second information corresponding to the information indicating the arrangement state of the object in the fourth image, as learning data.

2. The learning data generation device according to claim 1,
wherein the one or more processors acquire, as the first information, information indicating one or more rectangular areas of a shape to surround a periphery of the object arranged in the predetermined arrangement state,
wherein the one or more processors deform the second image so as to fit within a deformed rectangular area which is deformed to conform to a size of the third image, and
wherein the one or more processors generate the fourth image by pasting the deformed second image to the third image.

3. The learning data generation device according to claim 2, wherein the one or more processors deform the second image while maintaining an aspect ratio of the second image.

4. The learning data generation device according to claim 3, wherein the one or more processors deform the second image using the aspect ratio set based on a length of a short side or a long side of the deformed rectangular area.

5. The learning data generation device according to claim 2,
wherein the one or more processors acquire the second image of a first aspect ratio that matches or is similar to the aspect ratio of the deformed rectangular area, instead of deforming the second image, and
wherein the one or more processors generate the fourth image by pasting the second image of the first aspect ratio to the third image.

6. The learning data generation device according to claim 2,
wherein the second image includes a fifth image which is an image similar to the deformed second image already pasted at the time of generating the fourth image,
wherein the one or more processors deform the fifth image so as to fit within the deformed rectangular area, and
wherein the one or more processors generate the fourth image by pasting a deformed fifth image at a position adjacent to the deformed second image already pasted at the time of generating the fourth image.

7. The learning data generation device according to claim 1,
wherein the one or more processors acquire, as the first information, information indicating one or plural rectangular areas of a shape to surround a periphery of the object arranged in the predetermined arrangement state, and
wherein the one or more processors generate the fourth image by pasting the deformed second image to an area other than the rectangular area in the first image.

8. The learning data generation device according to claim 1, wherein the second image includes an image of a real object and an image of an unreal object.

9. A learning data generation method comprising:
acquiring a first image corresponding to an image obtained by photographing one or more objects arranged in a predetermined arrangement state, and first information corresponding to information indicating the predetermined arrangement state in the first image;
deforming a second image corresponding to an image of a desired object;
generating a fourth image having an arrangement state that matches or is similar to the predetermined arrangement state indicated by the first image, by pasting a deformed second image to the first image or a third image corresponding to the image of a position where the desired object is arranged; and
generating data including the fourth image and second information corresponding to the information indicating the arrangement state of the object in the fourth image, as learning data.

10. A non-transitory computer-readable recording medium recording a program, the program causing a computer to a processing comprising:
acquiring a first image corresponding to an image obtained by photographing one or more objects arranged in a predetermined arrangement state, and first information corresponding to information indicating the predetermined arrangement state in the first image;

deforming a second image corresponding to an image of a desired object;

generating a fourth image having an arrangement state that matches or is similar to the predetermined arrangement state indicated by the first image, by pasting a deformed second image to the first image or a third image corresponding to the image of a position where the desired object is arranged; and generating data including the fourth image and second information corresponding to the information indicating the arrangement state of the object in the fourth image, as learning data.

* * * * *